US010909982B2

(12) United States Patent
Kwon et al.

(10) Patent No.: US 10,909,982 B2
(45) Date of Patent: Feb. 2, 2021

(54) ELECTRONIC APPARATUS FOR PROCESSING USER UTTERANCE AND CONTROLLING METHOD THEREOF

(71) Applicant: Samsung Electronics Co., Ltd, Suwon-si (KR)

(72) Inventors: Woo Up Kwon, Seoul (KR); Jung Hoe Kim, Seongnam-si (KR); Kyu Young Kim, Hwaseong-si (KR); Hyun Jin Park, Suwon-si (KR); Kyoung Gu Woo, Seoul (KR); In Jong Rhee, Seongnam-si (KR); Dong Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 15/967,493

(22) Filed: Apr. 30, 2018

(65) Prior Publication Data

US 2018/0315427 A1 Nov. 1, 2018

(30) Foreign Application Priority Data

Apr. 30, 2017 (KR) ........................ 10-2017-0055830

(51) Int. Cl.
*G10L 15/22* (2006.01)
*G10L 15/18* (2013.01)
*G06F 3/16* (2006.01)
*G10L 15/30* (2013.01)
*G10L 15/26* (2006.01)

(52) U.S. Cl.
CPC .............. *G10L 15/22* (2013.01); *G06F 3/167* (2013.01); *G10L 15/1815* (2013.01); *G10L 15/26* (2013.01); *G10L 15/30* (2013.01); *G10L 2015/221* (2013.01); *G10L 2015/223* (2013.01); *G10L 2015/225* (2013.01)

(58) Field of Classification Search
CPC .............. G10L 15/22; G10L 2015/221; G10L 2015/223; G10L 2015/225; G10L 15/26; G10L 15/28; G10L 15/30; G10L 15/1815; G06F 3/167
See application file for complete search history.

(56) References Cited

U.S. PATENT DOCUMENTS 4,348,550 A * 9/1982 Pirz ...................... H04M 1/271
379/355.06
5,845,246 A * 12/1998 Schalk .................. G10L 15/065
704/243

(Continued)

*Primary Examiner* — Eric Yen

(57) ABSTRACT

An electronic apparatus includes a touch screen display, a microphone disposed at least one speaker, a wireless communication circuit, a processor, and a memory. The memory stores instructions that, when executed, cause the processor to receive a first user utterance input, to transmit first data associated with the first user utterance input to an external server, to receive a first response, to provide the first sample utterances, to receive a first user input for selecting one of the first sample utterances, to transmit second data associated with the first user input to the external server, and to perform the second task by causing the electronic apparatus to have a sequence of states. The first user utterance input includes a request for performing a first task. The first response includes first sample utterances indicating a second task.

18 Claims, 20 Drawing Sheets

(56) References Cited

U.S. PATENT DOCUMENTS

| | | | |
|---|---|---|---|
| 7,447,299 B1 * | 11/2008 | Partovi | G10L 15/22 379/88.01 |
| 8,165,886 B1 * | 4/2012 | Gagnon | G10L 15/19 704/275 |
| 8,868,409 B1 * | 10/2014 | Mengibar | G06F 40/30 704/9 |
| 9,645,575 B2 | 5/2017 | Watson | |
| 9,761,228 B2 * | 9/2017 | Ogawa | G10L 15/10 |
| 9,818,425 B1 * | 11/2017 | Ayrapetian | G10L 15/30 |
| 10,423,709 B1 * | 9/2019 | Bradley | G06F 40/16 |
| 10,515,121 B1 * | 12/2019 | Setlur | G10L 15/1815 |
| 2001/0047264 A1 * | 11/2001 | Roundtree | G06F 16/9537 704/275 |
| 2002/0094512 A1 * | 7/2002 | Bhogal | G10L 15/26 434/169 |
| 2003/0061039 A1 * | 3/2003 | Levin | G10L 15/26 704/246 |
| 2005/0177376 A1 * | 8/2005 | Cooper | G10L 15/065 704/277 |
| 2007/0276651 A1 * | 11/2007 | Bliss | G10L 15/30 704/9 |
| 2008/0091406 A1 * | 4/2008 | Baldwin | G10L 25/51 704/4 |
| 2009/0112605 A1 * | 4/2009 | Gupta | G06F 3/167 704/275 |
| 2009/0119104 A1 * | 5/2009 | Weng | H04M 3/10 704/244 |
| 2011/0112921 A1 * | 5/2011 | Kennewick | G06Q 30/0601 705/26.1 |
| 2012/0316875 A1 * | 12/2012 | Nyquist | G10L 15/30 704/235 |
| 2013/0262104 A1 * | 10/2013 | Makhija | G06Q 10/087 704/235 |
| 2013/0339031 A1 * | 12/2013 | Yoon | H04N 21/42203 704/275 |
| 2014/0272821 A1 | 9/2014 | Pitschel et al. | |
| 2015/0121216 A1 | 4/2015 | Brown et al. | |
| 2015/0348547 A1 * | 12/2015 | Paulik | G10L 15/197 704/251 |
| 2016/0225370 A1 * | 8/2016 | Kannan | G10L 15/063 |
| 2016/0342317 A1 | 11/2016 | Lim et al. | |
| 2017/0103061 A1 * | 4/2017 | Kobayashi | G06F 40/268 |
| 2017/0357478 A1 * | 12/2017 | Piersol | G10L 15/30 |
| 2018/0329677 A1 * | 11/2018 | Gruber | G06F 3/0488 |
| 2018/0329957 A1 * | 11/2018 | Frazzingaro | G06F 16/24564 |
| 2019/0035397 A1 * | 1/2019 | Reily | G06F 3/165 |
| 2019/0236130 A1 * | 8/2019 | Li | G06N 3/0427 |

* cited by examiner

ELECTRONIC APPARATUS FOR PROCESSING USER UTTERANCE AND CONTROLLING METHOD THEREOF

CROSS-REFERENCE TO RELATED APPLICATION(S) AND CLAIM OF PRIORITY

This application is based on and claims priority under 35 U.S.C. § 119 to Korean Patent Application No. 10-2017-0055830 filed on Apr. 30, 2017, in the Korean Intellectual Property Office, the disclosure of which is incorporated by reference herein in its entirety.

BACKGROUND

1. Field

The present disclosure relates to a technology for processing a user's utterance.

2. Description of Related Art

In addition to input schemes using a keyboard or a mouse, electronic apparatuses have recently supported various input schemes such as a voice input and the like. For example, the electronic apparatus such as a smartphone or a tablet PC may recognize the voice of a user input in a state where a speech recognition service is executed and may execute an action corresponding to a voice input or may provide the result found depending on the voice input.

Nowadays, the speech recognition service is being developed based on a technology processing a natural language. The technology processing the natural language refers to a technology that grasps the intent of the user utterance and provides the user with the result suitable for the intent.

The above information is presented as background information only to assist with an understanding of the present disclosure. No determination has been made, and no assertion is made, as to whether any of the above might be applicable as prior art with regard to the present disclosure.

SUMMARY

A speech recognition service according to certain embodiments of this disclosure may suggest a task by using a user utterance. Even though there are many users of the electronic apparatus who perform a task, there is only one server for creating the task. Since the preference of each user is not reflected when the server provides the task, the conventional service may provide the user with inconvenience.

Aspects of the present disclosure address at least the above-mentioned problems and/or disadvantages and to provide at least the advantages described below. Accordingly, an aspect of the present disclosure is to describe a method of providing an electronic apparatus with a task, which is suitable for a user's intent and is personalized, by using feedback data of a user associated with the task provided by the server.

In accordance with certain embodiments of the present disclosure, an electronic apparatus includes a housing, a touch screen display disposed inside the housing and exposed through a first portion of the housing, a microphone disposed inside the housing and exposed through a second portion of the housing, at least one speaker disposed inside the housing and exposed through a third portion of the housing, a wireless communication circuit disposed inside the housing, a processor disposed inside the housing and electrically connected to the touch screen display, the microphone, the at least one speaker, and the wireless communication circuit, and a memory disposed inside the housing, and electrically connected to the processor. The memory stores instructions that, when executed, cause the processor to receive a first user utterance input through at least one of the touch screen display or the microphone, to transmit first data associated with the first user utterance input to an external server through the wireless communication circuit, to receive a first response from the external server through the wireless communication circuit, to provide the plurality of first sample utterances through the touch screen display or the speaker, to receive a first user input for selecting one of the plurality of first sample utterances, to transmit second data associated with the first user input to the external server, and after transmitting the second data, to perform the second task by causing the electronic apparatus to have a sequence of states. The first user utterance input includes a request for performing a first task using the electronic apparatus. The first response includes a plurality of first sample utterances indicating a second task the same as, similar to, or different from the first task.

In accordance with some embodiments of the present disclosure, a system device includes a communication interface connected to a network, a processor electrically connected to the communication interface, and a memory electrically connected to the processor. The memory stores instructions that, when executed, cause the processor to receive first data associated with a first user utterance input from an electronic apparatus through the communication interface, wherein the first data associated with the first user utterance input includes at least one of the first user utterance input or context information of the electronic apparatus, to perform a natural language understanding process for a first request, to determine a plurality of rule IDs and a confidence level corresponding to each of the plurality of rule IDs from the natural language understanding process, when the confidence level exceeds a critical value, to determine whether a first item, to which a first tagged utterance text being a text corresponding to a first rule ID is matched, in a text corresponding to the first user utterance input is in a first list of pre-stored first items, wherein the first rule ID is a rule ID, which has the highest confidence level, from among the determined plurality of rule IDs, when the first item, to which the first tagged utterance text is matched, is not in the first list, provide the electronic apparatus with the first rule ID and a first path rule based on the first data, and when the first item to which the first tagged utterance text is matched is in the first list, to provide the electronic apparatus with a first white list rule ID that the matched first item includes and a second path rule based on the first data, and when the confidence level does not exceed the critical value, to select a plurality of third rule IDs being at least part of a rule ID among the plurality of rule IDs, to determine whether a second item, to which at least one of a plurality of second tagged utterance texts being a text, which corresponds to each of the plurality of third rule IDs, in the text corresponding to the first user utterance input is matched is in a second list of pre-stored second items, when the second item to which at least one of the second tagged utterance texts is matched is not in the second list, to provide the electronic apparatus with the first data and a plurality of sample utterances respectively corresponding to the plurality of third rule IDs, and when the second item to which at least one of the second tagged utterance texts is matched is in the second list, to provide the electronic apparatus with a fourth path rule based on the first data and a second white list rule ID included in the second item to which the at least one of the second tagged utterance texts is matched.

In accordance with various embodiments of the present disclosure, a computer-readable storage medium stores instructions, which when executed by a processor of a system device, cause the system device to receive first data associated with a first user utterance input from an electronic device through the communication interface, to perform a natural language understanding process for a first request, to determine a plurality of rule IDs and a confidence level corresponding to each of the plurality of rule IDs from the natural language understanding process, when the confidence level exceeds a critical value, to determine whether a first item, to which a first tagged utterance text being a text corresponding to a first rule ID is matched, in a text corresponding to the first user utterance input is in a first list of pre-stored first items, and when the first item, to which the first tagged utterance text is matched, is not in the first list, to provide the electronic device with the first rule ID and a first path rule based on the first data, and when the first item to which the first tagged utterance text is matched is in the first list, to provide the electronic device with a first white list rule ID that the matched first item includes and a second path rule based on the first data, and when the confidence level does not exceed the critical value, select a plurality of third rule IDs being at least part of a rule ID among the plurality of rule IDs, to determine whether a second item, to which at least one of a plurality of second tagged utterance texts being a text, which corresponds to each of the plurality of third rule IDs, in the text corresponding to the first user utterance input is matched is in a second list of pre-stored second items, when the second item to which at least one of the second tagged utterance texts is matched is not in the second list, to provide the electronic device with the first data and a plurality of sample utterances respectively corresponding to the plurality of third rule IDs, and when the second item to which at least one of the second tagged utterance texts is matched is in the second list, to provide the electronic device with a fourth path rule based on the first data and a second white list rule ID included in the second item to which at least one of the second tagged utterance texts is matched. The first data associated with the first user utterance input includes at least one of the first user utterance input or context information of the electronic device, the first rule ID is a rule ID, which has the highest confidence level, from among the determined plurality of rule IDs.

In accordance with various embodiments of the present disclosure, a system device includes a communication interface connected to a network, a processor electrically connected to the communication interface, and a memory electrically connected to the processor. The memory stores instructions that, when executed, cause the processor to receive first data associated with a first natural language input from an electronic apparatus through the communication interface, to perform a natural language understanding process for the first request, to determine a confidence level from the natural language understanding process, when the confidence level exceeds a critical value, to determine whether the first request is in a first list of pre-stored requests, when the first request is in the first list, to provide the electronic apparatus with a response for a second request different from the first request, and when the first request is not in the first list, to provide the electronic apparatus with a response for the first request; and when the confidence level does not exceed the critical value, to select a plurality of third requests, meaning each of which is the same as, similar to, or different from meaning of the first request, to determine whether at least one of the selected third requests is in a second list of the pre-stored requests, when the at least one of the selected third requests is in the second list of the pre-stored requests, to provide the electronic apparatus with a response for the at least one third request, and when the selected third requests are not in the second list of the pre-stored requests, to provide the electronic apparatus with information about the selected third requests. The first natural language input includes a first request for performing a first task using the electronic apparatus.

According to various embodiments of the present disclosure, it may be possible to provide a task that is matched to a user's intent by providing the task using the feedback data of the user.

According to various embodiments of the present disclosure, it may be possible to continuously update the feedback data of the user. In addition, the task may be inferred from the natural language input by using the updated feedback data, and the feedback data may be trained by using the inferred result.

According to various embodiments of the present disclosure, since training data is generated based on the feedback of the user and then a task is generated by using the trained data, a natural language understanding process model may be updated by using white list data collected during a specific interval.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing various embodiments of the present disclosure, an integrated intelligent system to which certain embodiments of the present disclosure is applied will be described.

Figure 1:
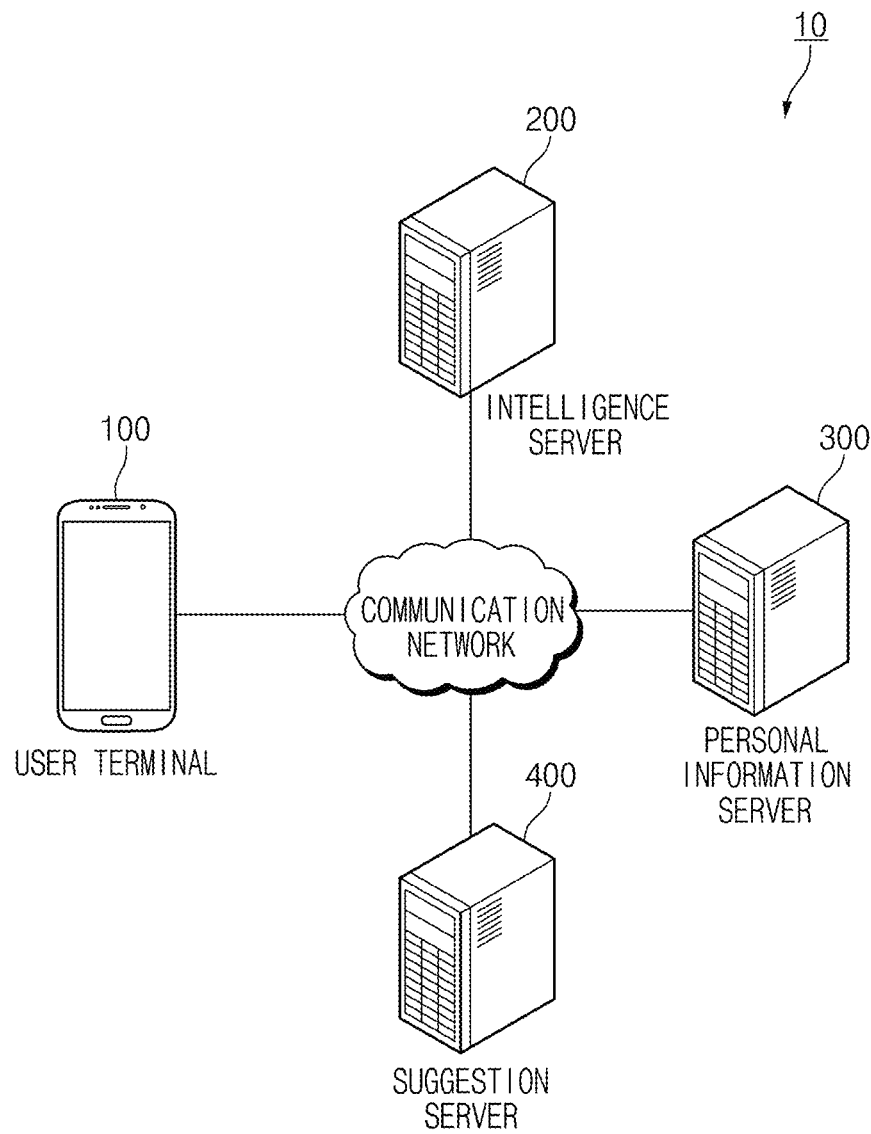
FIG. 1 illustrates an integrated intelligent system, according to various embodiments of the present disclosure.

FIG. 1 illustrates an integrated intelligent system, according to various embodiments of the present disclosure.

Referring to the non-limiting example of FIG. 1, an integrated intelligent system 10 may include a user terminal 100, an intelligence server 200, a personal information server 300, and a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to some embodiments, various types of terminal devices (or an electronic apparatus), which are connected with Internet, such as a mobile phone, a smartphone, personal digital assistant (PDA), a notebook computer, and the like may correspond to the user terminal 100.

According to various embodiments, the user terminal 100 may receive a user input in the form of a user utterance. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to certain embodiments, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
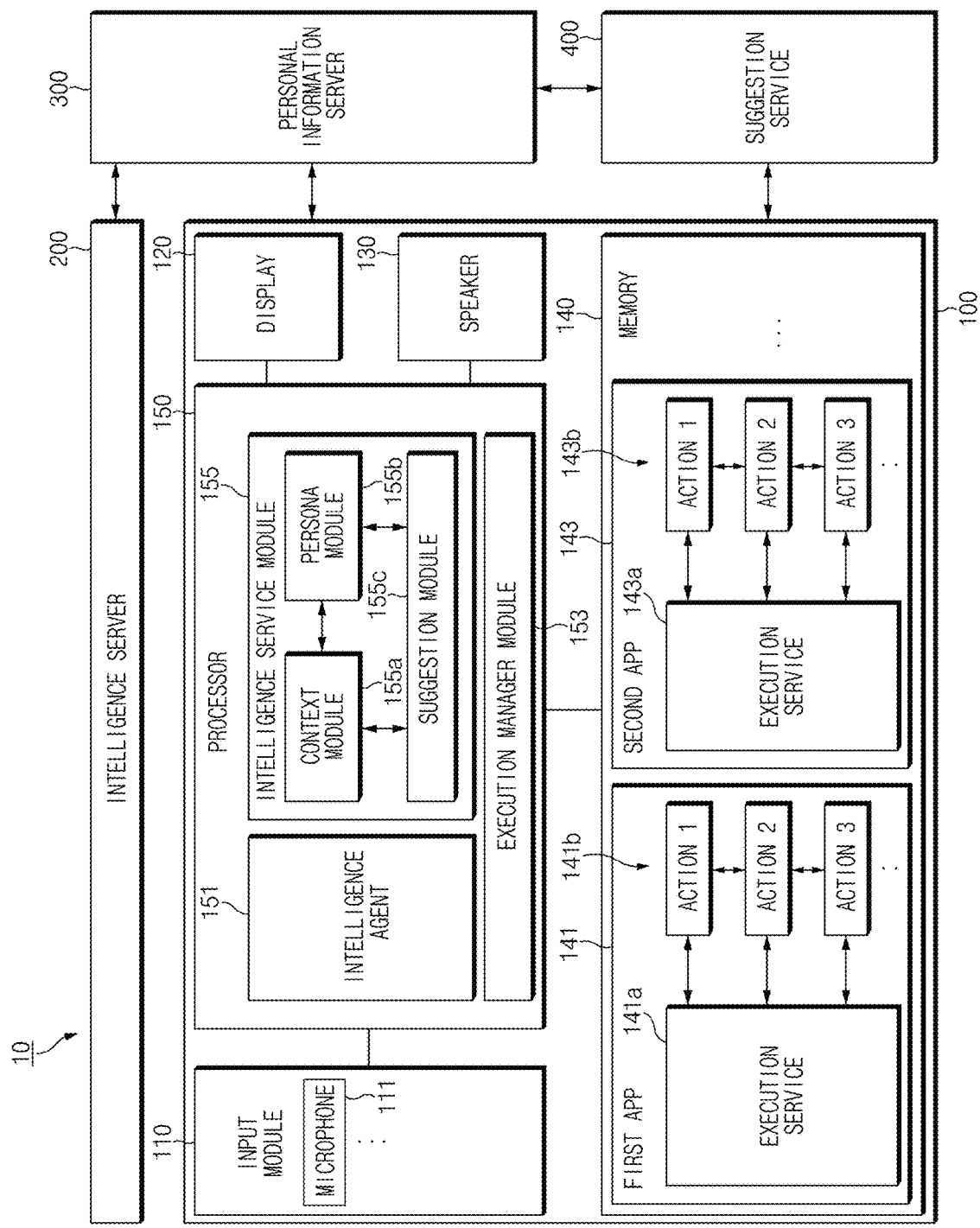
FIG. 2 illustrates, in block diagram format, a user terminal of an integrated intelligent system, according to certain embodiments of the present disclosure.

FIG. 2 illustrates, in block diagram format, a user terminal of an integrated intelligent system, according to some embodiments of the present disclosure.

Referring to the non-limiting example of FIG. 2, the user terminal 100 may include an input module 110, a display 120, a speaker 130, a memory 140, or a processor 150. The user terminal 100 may further include housing, and elements of the user terminal 100 may be disposed in the housing or on the housing.

According to various embodiments, the input module 110 may receive a user input from a user. In some embodiments, the input module 110 may receive the user input from the connected external device (e.g., a keyboard or a headset). In other embodiments, the input module 110 may include a touch screen (e.g., a touch screen display) coupled to the display 120. For another example, the input module 110 may include a hardware key (e.g., hardware key 112 of FIG. 3) (or a physical key) placed in the user terminal 100 (or the housing of the user terminal 100).

According to certain embodiments, the input module 110 may include a microphone (e.g., microphone 111 of FIG. 3) that is capable of receiving a user utterance as a voice signal. For example, the input module 110 may include a speech input system and may receive the utterance of the user as a voice signal through the speech input system.

According to some embodiments, the display 120 may display an image, a video, and/or an execution screen of an application. For example, the display 120 may display a graphic user interface (GUI) of an app.

According to various embodiments, the speaker 130 may output the voice signal. For example, the speaker 130 may output the voice signal generated in the user terminal 100 to the outside.

According to certain embodiments, the memory 140 may store a plurality of apps 141 and 143. The plurality of apps 141 and 143 stored in the memory 140 may be selected, launched, and executed according to the user input.

According to some embodiments, the memory 140 may include a database capable of storing information necessary to recognize the user input. For example, the memory 140 may include a log database capable of storing log information. For another example, the memory 140 may include a persona database capable of storing user information.

According to various embodiments, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

According to certain embodiments, when the actions 141b and 143b of the apps 141 and 143 are executed, an execution state screen according to the execution of the actions 141b and 143b may be displayed in the display 120. As an example, the execution state screen may be a screen in a state where the actions 141b and 143b are completed. As another example, the execution state screen may be a screen in a state where the execution of the actions 141b and 143b is in partial landing (e.g., in the case where a parameter necessary for the actions 141b and 143b are not input).

According to some embodiments, the execution services 141a and 143a may execute the actions 141b and 143b depending on a path rule. For example, the execution services 141a and 143a may be activated by the execution manager module 153, may receive an execution request from the execution manager module 153 depending on the path rule, and may execute the actions 141b and 143b of the apps 141 and 143 depending on the execution request. When the execution of the actions 141b and 143b is completed, the execution services 141a and 143a may transmit completion information to the execution manager module 153.

According to various embodiments, in the case where the plurality of the actions 141b and 143b are respectively executed in the apps 141 and 143, the plurality of the actions 141b and 143b may be sequentially executed. When the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141b and 143b to an execution service (e.g., action 2). According to certain embodiments, in the case where the plurality of apps 141 and 143 are executed, the plurality of apps 141 and 143 may be sequentially executed. For example, when receiving the completion information after the execution of the last action of the first app 141 is executed, the execution manager module 153 may transmit the execution request of the first action of the second app 143 to the execution service 143*a*.

According to some embodiments, in the case where the plurality of the actions 141*b* and 143*b* are executed in the apps 141 and 143, a result screen according to the execution of each of the executed plurality of the actions 141*b* and 143*b* may be displayed in the display 120. According to various embodiments, only a part of a plurality of result screens according to the executed plurality of the actions 141*b* and 143*b* may be displayed in the display 120.

According to certain embodiments, the memory 140 may store an intelligence app (e.g., a speech recognition app) operating in conjunction with an intelligence agent 151. The app operating in conjunction with the intelligence agent 151 may receive and process the utterance of the user as a voice signal. According to some embodiments, the app operating in conjunction with the intelligence agent 151 may be operated by a specific input (e.g., an input through a hardware key, an input through a touch screen, or a specific voice input) input through the input module 110.

According to various embodiments, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to certain embodiments, the processor 150 may include the intelligence agent 151, the execution manager module 153, or an intelligence service module 155. In some embodiments, the processor 150 may drive the intelligence agent 151, the execution manager module 153, or the intelligence service module 155 by executing instructions stored in the memory 140. Modules described in various embodiments of the present disclosure may be implemented by hardware or by software. In various embodiments of the present disclosure, it should be understood that the action executed by the intelligence agent 151, the execution manager module 153, or the intelligence service module 155 is an action executed by the processor 150.

According to various embodiments, the intelligence agent 151 may generate an instruction for operating an app based on the voice signal received as the user input. According to certain embodiments, the execution manager module 153 may receive the generated instruction from the intelligence agent 151, and may select, launch, and operate the apps 141 and 143 stored in the memory 140. According to some embodiments, the intelligence service module 155 may manage information of the user and may use the information of the user to process the user input.

The intelligence agent 151 may transmit and process the user input received through the input module 110 to the intelligence server 200.

According to various embodiments, before transmitting the user input to the intelligence server 200, the intelligence agent 151 may pre-process the user input. According to certain embodiments, to pre-process the user input, the intelligence agent 151 may include an adaptive echo canceller (AEC) module, a noise suppression (NS) module, an end-point detection (EPD) module, or an automatic gain control (AGC) module. The AEC module may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to some embodiments, the intelligence agent 151 may include all the pre-processing elements for performance. However, in another embodiment, the intelligence agent 151 may include a part of the pre-processing elements to operate at low power.

According to various embodiments, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to certain embodiments, the wake up recognition module of the intelligence agent 151 may be implemented with a low-power processor (for example, a processor included in an audio codec). According to some embodiments, the intelligence agent 151 may be activated depending on the user input entered through a hardware key. In the case where the intelligence agent 151 is activated, an intelligence app (for example, a speech recognition app) operating in conjunction with the intelligence agent 151 may be executed.

According to various embodiments, the intelligence agent 151 may include a speech recognition module for performing the user input. The speech recognition module may recognize the user input for executing an action in an app. For example, the speech recognition module may recognize a limited user (voice) input (e.g., an utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to certain embodiments, the speech recognition module for executing the user input of the intelligence agent 151 may be implemented in an app processor.

According to some embodiments, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to various embodiments, the intelligence agent 151 may convert the voice input of the user to text data. According to certain embodiments, the intelligence agent 151 may transmit the voice of the user to the intelligence server 200 to receive the changed text data. As such, the intelligence agent 151 may display the text data in the display 120.

According to some embodiments, the intelligence agent 151 may receive a path rule from the intelligence server 200. According to various embodiments, the intelligence agent 151 may transmit the path rule to the execution manager module 153.

According to certain embodiments, the intelligence agent 151 may transmit the execution result log according to the path rule received from the intelligence server 200 to the intelligence service module 155, and the transmitted execution result log may be accumulated and managed in preference information of the user of a persona module 155b.

According to some embodiments, the execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to various embodiments, the execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to certain embodiments, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing states (for example, where a parameter necessary for the actions 141b and 143b has not been inputted), the execution manager module 153 may transmit information about the partial landing to the intelligence agent 151. The intelligence agent 151 may make a request for an input of necessary information (e.g., parameter information) to the user by using the received information. For another example, in the case where the execution states of the actions 141b and 143b are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the user utterance through the intelligence server 200 and may transmit the received parameter information to the execution manager module 153. The execution manager module 153 may change a parameter of each of the actions 141b and 143b to a new parameter by using the received parameter information.

According to some embodiments, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to various embodiments, the execution manager module 153 may receive a plurality of path rules. The execution manager module 153 may select a plurality of path rules based on the utterance of the user. For example, in the case where the user utterance specifies the app 141 executing a part of the action 141b but does not specify the app 143 executing any other action 143b, the execution manager module 153 may receive a plurality of different path rules in which the same app 141 (e.g., an gallery app) executing the part of the action 141b is executed and in which different apps 143 (e.g., a message app or a Telegram app) executing the other action 143b. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to certain embodiments, the intelligence service module 155 may include a context module 155a, a persona module 155b, or a suggestion module 155c.

The context module 155a may, in certain embodiments, collect current states of the apps 141 and 143 from the apps 141 and 143. For example, the context module 155a may receive context information indicating the current states of the apps 141 and 143 to collect the current states of the apps 141 and 143.

The persona module 155b may manage personal information of the user utilizing the user terminal 100. For example, the persona module 155b may collect the usage information and the execution result of the user terminal 100 to manage personal information of the user.

The suggestion module 155c may predict the intent of the user to recommend an instruction to the user. For example, the suggestion module 155c may recommend an instruction to the user in consideration of the current state (e.g., a time, a place, context, or an app) of the user.

Figure 3:
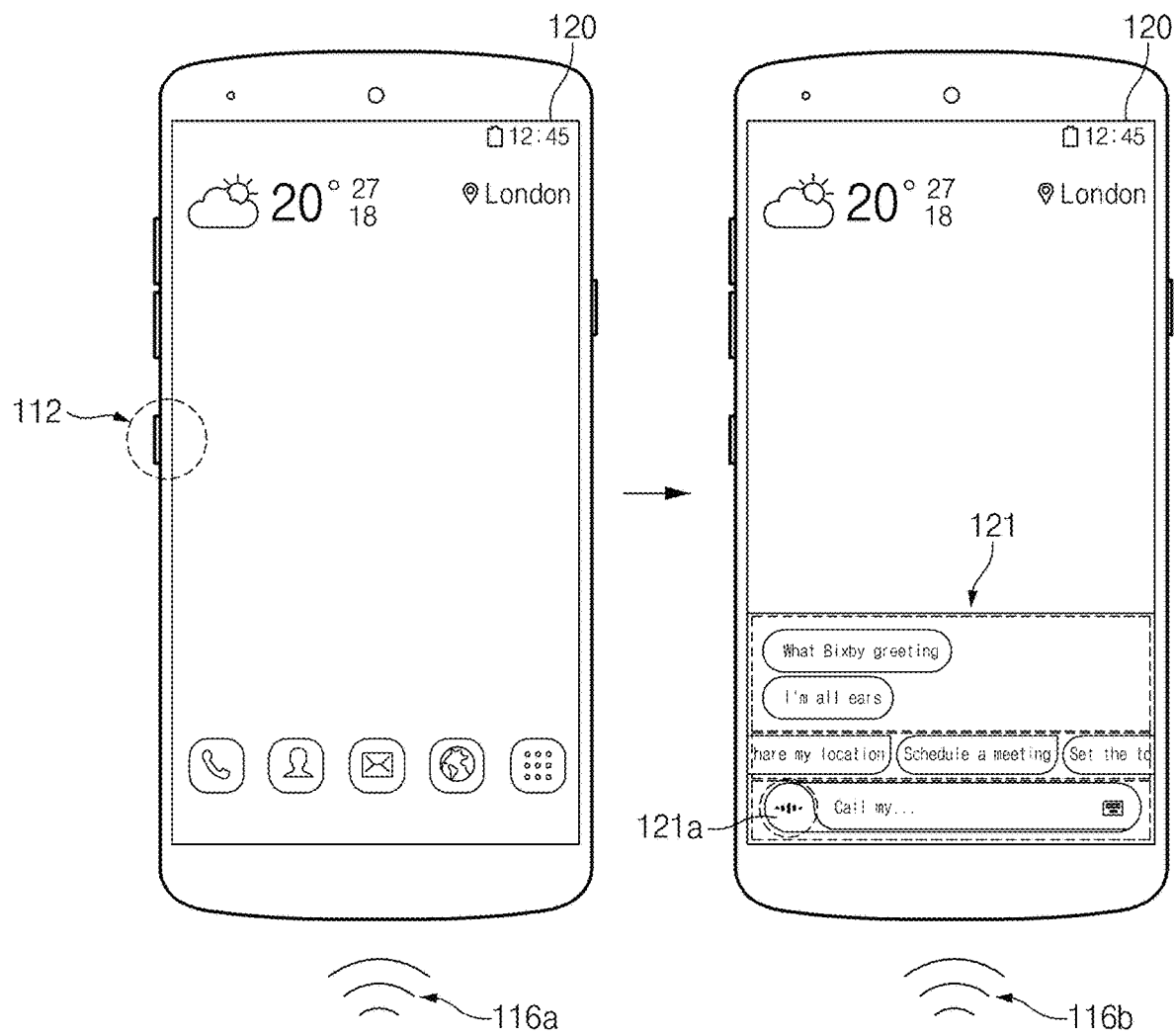
FIG. 3 illustrates screens of an executing intelligence app of a user terminal, according to some embodiments of the present disclosure.

FIG. 3 illustrates screens of a user terminal where an intelligence app according to certain embodiments of this disclosure is executed.

The non-limiting example of FIG. 3 illustrates that the user terminal 100 receives a user input to execute an intelligence app (for example, a speech recognition app) operating in conjunction with the intelligence agent 151.

According to various embodiments, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121a of the UI 121 of the intelligence app for the purpose of entering a voice input 111b in a state where the UI 121 of the intelligence app is displayed in the display 120. For another example, while continuously pressing the hardware key 112 to enter the voice input 111b, the user may enter the voice input 111b.

According to certain embodiments, the user terminal 100 may execute the intelligence app for recognizing a voice input through the microphone 111. For example, in the case where a specified voice input (e.g., wake up!) is entered 111a through the microphone 111, the user terminal 100 may display the UI 121 of the intelligence app in the display 120.

Figure 4:
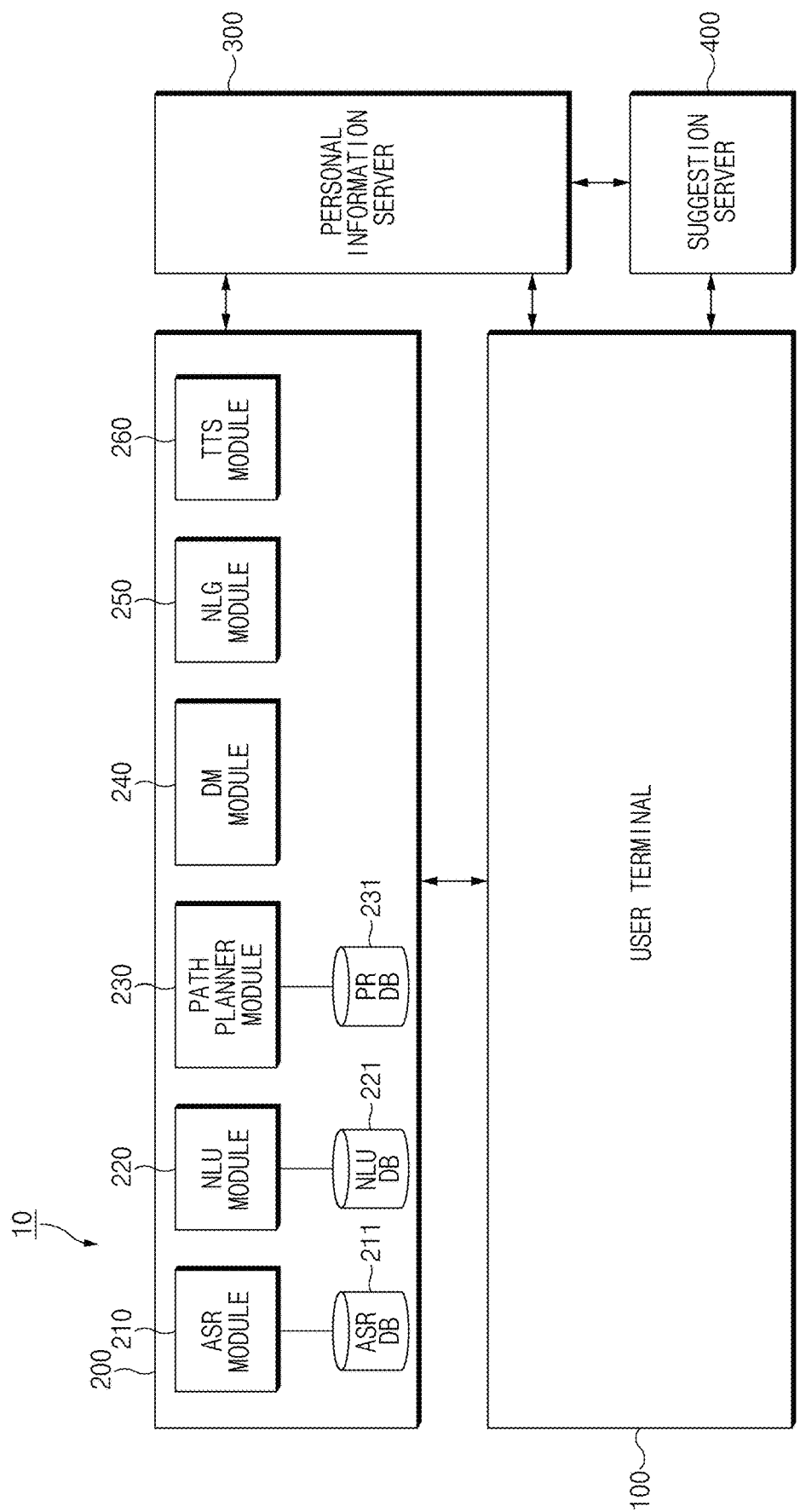
FIG. 4 illustrates, in block diagram format, an intelligence server of an integrated intelligent system, according to various embodiments of the present disclosure.

FIG. 4 illustrates, in block diagram format, an intelligence server of an integrated intelligent system, according to some embodiments of the present disclosure.

Referring to the non-limiting example of FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to various embodiments, the ASR module 210 may convert the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to certain embodiments, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to some embodiments, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to various embodiments, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to certain embodiments, the NLU module 220 may determine a parameter of the user input by using the words that are the basis for grasping the intent. According to some embodiments, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to various embodiments, the ASR module 210 as well as the NLU module 220 may recognize the voice of the user with reference to the PLM stored in the NLU DB 221.

According to certain embodiments, the NLU module 220 may generate a path rule based on the intent of the user input and the parameter. For example, the NLU module 220 may select an app to be executed, based on the intent of the user input and may determine an action to be executed in the selected app. The NLU module 220 may determine the parameter corresponding to the determined action to generate the path rule. According to some embodiments, the path rule generated by the NLU module 220 may include information about the app to be executed, the action to be executed in the app, and a parameter necessary to execute the action.

According to various embodiments, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to certain embodiments, the NLU module 220 may select at least one path rule of the generated plurality of path rules. For example, the NLU module 220 may select an optimal path rule of the plurality of path rules. For another example, in the case where only a part of an action is specified based on the user utterance, the NLU module 220 may select a plurality of path rules. The NLU module 220 may determine one path rule of the plurality of path rules depending on an additional input of the user.

According to some embodiments, the NLU module 220 may transmit the path rule to the user terminal 100 in response to a request for the user input. For example, the NLU module 220 may transmit one path rule corresponding to the user input to the user terminal 100. As another example, the NLU module 220 may transmit the plurality of path rules corresponding to the user input to the user terminal 100. For example, in the case where only a part of action is specified based on the user utterance, the plurality of path rules may be generated by the NLU module 220.

According to various embodiments, the path planner module 230 may select at least one path rule of the plurality of path rules.

According to certain embodiments, the path planner module 230 may transmit a path rule set including the plurality of path rules to the NLU module 220. The plurality of path rules of the path rule set may be stored in the PR DB 231 connected to the path planner module 230 in tabular form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to some embodiments, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to various embodiments, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to certain embodiments, the path planner module 230 may store the generated path rule in the PR DB 231.

According to some embodiments, the path planner module 230 may store the path rule generated by the NLU module 220 in the PR DB 231. The generated path rule may be added to the path rule set stored in the PR DB 231.

According to various embodiments, the table stored in the PR DB 231 may include a plurality of path rules or a plurality of path rule sets. The plurality of path rules or the plurality of path rule sets may reflect the kind, version, type, or characteristic of a device performing each path rule.

According to certain embodiments, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to some embodiments, in the case where the user intent is not clear, the DM module 240 may provide feedback for making a request for necessary information to the user. For example, the DM module 240 may perform a feedback process for making a request for information about the parameter for grasping the user intent.

According to various embodiments, the DM module 240 may include a content provider module. In the case where the content provider module executes an action based on the intent and the parameter grasped by the NLU module 220, the content provider module may generate the result obtained by performing a task corresponding to the user input. According to certain embodiments, the DM module 240 may transmit the result generated by the content provider module as the response to the user input to the user terminal 100.

According to some embodiments, the natural language generating module NLG 250 may change specified information to a text form. Information changed to text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to various embodiments, the TTS module 260 may convert information of the text form to information of a voice form. The TTS module 260 may receive the information of the text form from the NLG module 250, may change the information of the text form to information of a voice form, and may transmit the information of the voice form to the user terminal 100. The user terminal 100 may output the information of the voice form to the speaker 130

According to certain embodiments, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
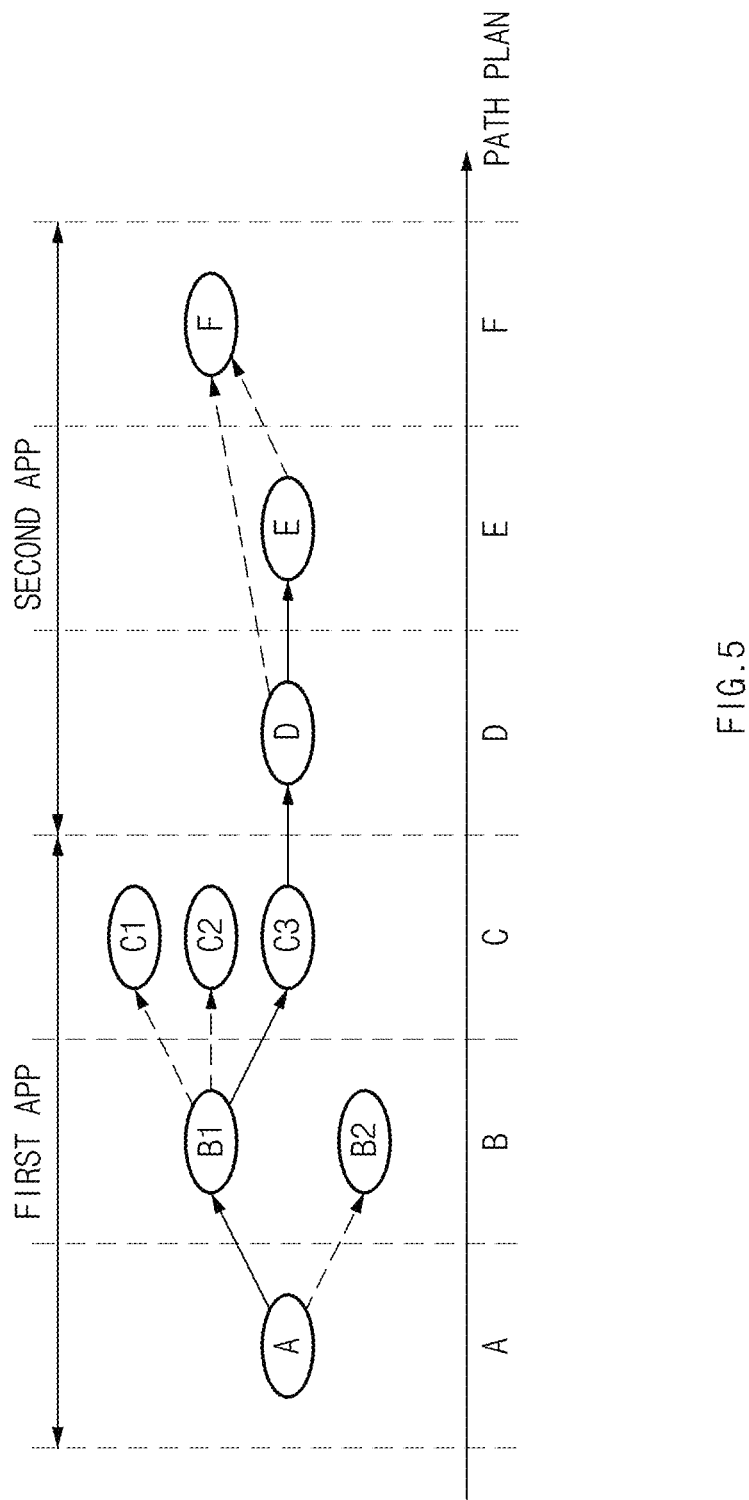
FIG. 5 illustrates aspects of a path rule-based method of generating a natural language understanding (NLU), according to certain embodiments of the present disclosure.

FIG. 5 illustrates aspects of a path rule-based method implemented by a path planner module, according to some embodiments of the present disclosure.

Referring to the non-limiting example of FIG. 5, according to various embodiments, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to certain embodiments, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to some embodiments, the plurality of path rules implemented in a form of ontology or a graph model may be stored in the PR DB 231.

According to various embodiments, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to certain embodiments, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to some embodiments, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to various embodiments, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. When the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to certain embodiments, in the case where a user input in which a portion of information is missing is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which the portion of the information is missing, by using the user information. As such, even though the user input in which a portion of information is missing is received by the intelligence server 200, the NLU module 220 may make a request for the missing information to receive an additional input or may determine a path rule corresponding to the user input by using user information.

Figure 6:
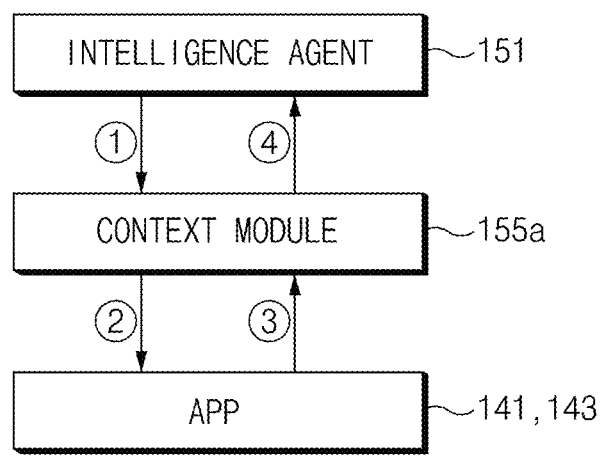
FIG. 6 illustrates, in block diagram format, a context module of a processor collecting a current state, according to some embodiments of the present disclosure.

FIG. 6 illustrates, in block diagram format a context module of a processor collecting a current state, according to some embodiments of the present disclosure.

Referring to the non-limiting example of FIG. 6, when receiving a context request from the intelligence agent 151 ③, the context module 155*a* may make a request for context information indicating current states of the apps 141 and 143 to the apps 141 and 143 ②. According to various embodiments, the context module 155*a* may receive the context information from the apps 141 and 143 ③ and may transmit the context information to the intelligence agent 151 ④.

According to certain embodiments, the context module 155*a* may receive pieces of context information through the apps 141 and 143. For example, the context information may be information about the most recently executed apps 141 and 143. As another example, the context information may be information (e.g., information about the corresponding picture in the case where a user watches a picture through a gallery app) about the current states in the apps 141 and 143.

According to some embodiments, the context module 155*a* may receive context information indicating a current state of the user terminal 100 from a device platform as well as the apps 141 and 143. The context information may include general context information, user context information, or device context information.

The general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). In another example, the general context information may include information about physical motion. In a further example, the information about the physical motion may include information about walking, running, driving, or the like. The information about the physical motion may be verified through a motion sensor. In the case of the information about driving, passengers' boarding and the vehicle's parking may be verified by sensing a Bluetooth connection in a vehicle, driving is verified through the motion sensor. As another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. As another example, the user context information may include information about the current state of the user. For example, the information about the current state of the user may include information about an interest, intent, or the like (e.g., shopping).

The device context information may include information about the state of the user terminal 100. For example, the device context information may include information about a path rule that the execution manager module 153 performs. For another example, the device information may include information about a battery. For example, the information about the battery may be verified through charging and discharging states of the battery. For another example, the device information may include information about a connected device and a network. For example, the information about the connected device may be verified through a communication interface connected with the device.

Figure 7:
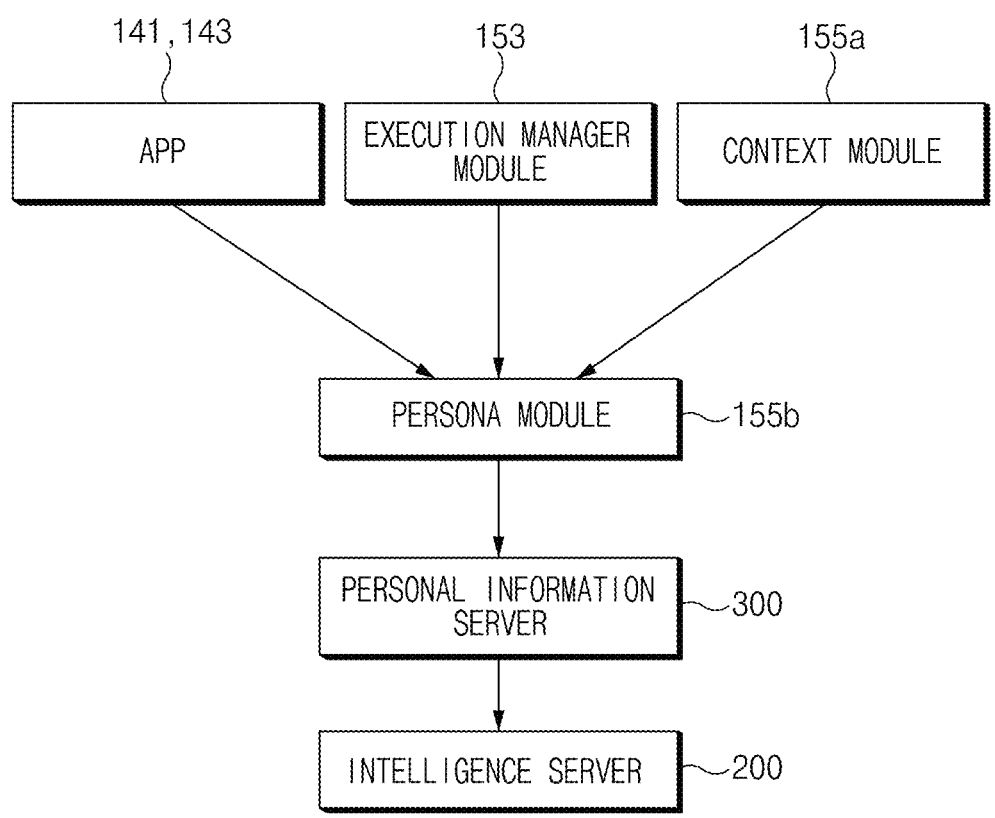
FIG. 7 illustrates, in block diagram format, a persona module managing information of a user, according to various embodiments of the present disclosure.

FIG. 7 illustrates, in block diagram format a persona module managing information of a user, according to various embodiments of the present disclosure.

Referring to the non-limiting example of FIG. 7, the persona module 155*b* may receive information of the user terminal 100 from the apps 141 and 143, the execution manager module 153, or the context module 155*a*. The apps 141 and 143 and the execution manager module 153 may store information about the result obtained by executing the actions 141*b* and 143*b* of an app in an action log database. The context module 155*a* may store information about a current state of the user terminal 100 in a context database. The persona module 155*b* may receive the stored information from the action log database or the context database. For example, data stored in the action log database and the context database may be analyzed by an analysis engine and may be transmitted to the persona module 155*b*.

According to certain embodiments, the persona module 155b may transmit information received from the apps 141 and 143, the execution manager module 153, or the context module 155a to the suggestion module 155c. For example, the persona module 155b may transmit the data stored in the action log database or the context database to the suggestion module 155c.

According to some embodiments, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to various embodiments, the persona module 155b may transmit the data stored in the action log database or the context database to the suggestion module 155c. User information generated by the persona module 155b may be stored in a persona database. The persona module 155b may periodically transmit the user information stored in the persona database to the personal information server 300. According to certain embodiments, the information transmitted to the personal information server 300 by the persona module 155b may be stored in the persona database. The personal information server 300 may estimate user information necessary to generate a path rule of the intelligence server 200 by using the information stored in the persona database.

According to some embodiments, the user information estimated by using information that the persona module 155b transmits may include profile information or preference information. The profile information or the preference information may be estimated through an account of the user and accumulated information.

The profile information may include personal information of the user. For example, the profile information may include population statistics information of the user. For example, the population statistics information may include gender, age, or the like of the user. For another example, the profile information may include life event information. For example, the life event information may be estimated by comparing log information with a life event model and may be strengthened by analyzing a behavior pattern. In another example, the profile information may include interest information. For example, the interest information may include shopping items of interest, interesting fields (e.g., sports, politics, and the like). As another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be estimated by using the activity area information (e.g., information about a house and a work place). The information about the sleep time may be estimated through an unused time of the user terminal 100.

The preference information may include preference information of the user. For example, the preference information may include information about app preference. For example, the app preference may be estimated through a usage log (e.g., a time- and place-specific usage log) of an app. The app preference may be used to determine an app to be executed depending on a current state (e.g., time or place) of the user. For another example, the preference information may include information about contact preference. For example, the contact preference may be estimated by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be estimated by analyzing information about setting frequency (e.g., a time- and place-specific frequency of setting a setting value) of a specific setting value. The setting information may be used to set a specific setting value depending on the current state (e.g., a time, a place, or context) of the user. For another example, the preference information may include place preference. For example, the place preference may be estimated through visit history (e.g., a time-specific visit history) of a specific place. The place preference may be used to determine a place to visit depending on the current state (e.g., time) of the user. As another example, the preference information may include instruction preference. For example, the instruction preference may be estimated through a usage frequency (for example, a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 8:
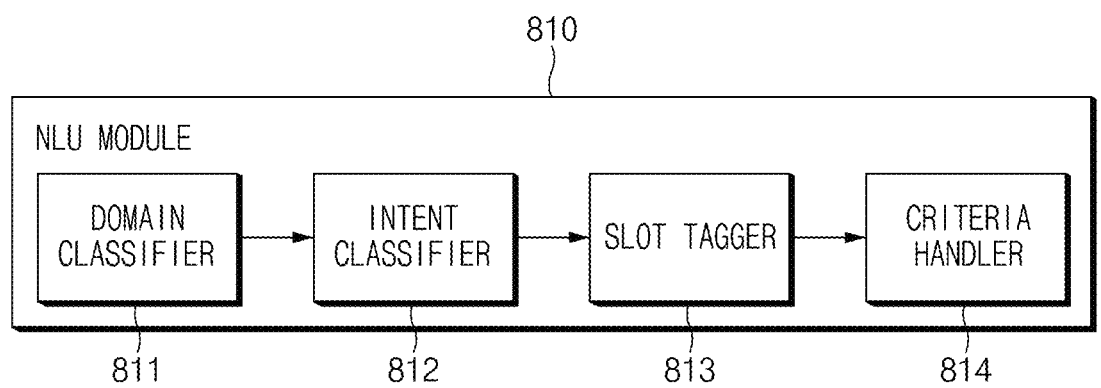
FIG. 8 illustrates, in block diagram format, a NLU module of an intelligence server, according to certain embodiments.

FIG. 8 illustrates, in block diagram format, a NLU module of the intelligence server 200, according to various embodiments.

Referring to the non-limiting example of FIG. 8, an NLU module 810 may include a domain classifier 811, an intent classifier 812, a slot tagger 813, a criteria handler 814, and the like. According to certain embodiments, the NLU module 810 of FIG. 8 may be NLU module 220 of FIG. 2.

The domain classifier 811 may determine a domain, to which a path rule belongs, based on at least one of a text corresponding to user utterance or context information. According to some embodiments, the domain may correspond to an app used when the path rule is performed According to various embodiments, the domain classifier 811 may use the text corresponding to the user utterance received from the ASR module 210. According to certain embodiments, the domain classifier 811 may use the text directly entered by a user.

According to some embodiments, the context information may include information (or information of an app being executed in background) of an app, which has been executed before the user utterance is entered, state information of the app, or the like. In various embodiments, the state information of the app may include a state ID, specific screen information of the app, specific state information in a specific screen, or the like.

According to certain embodiments, the domain classifier 811 may determine a plurality of domains. The domain classifier 811 may further determine a confidence level corresponding to each domain. According to some embodiments, the sum of a plurality of confidence levels may be '1'.

According to various embodiments, the domain classifier 811 may be implemented with a model using an artificial intelligence (AI) technology such as machine learning, or the like.

According to certain embodiments, the domain classifier 811 may integrate the confidence level of at least part of domains among the determined plurality of domains.

According to some embodiments, the domain classifier 811 may assign the integrated confidence level to a domain, which has the highest confidence level, from among target domains to be integrated.

In various embodiments, the relationship may be set in advance between domains, and the domain classifier 811 may integrate the domains having the relationship among the determined plurality of domains. According to certain embodiments, in the case where the difference between confidence levels of the domains having the relationship is not greater than a specified value, the domain classifier 811 may integrate the confidence levels of domains having the relationship.

For example, the message app and the contact app may be configured to have the relationship with each other. The plurality of domains determined by the domain classifier 811 may include a message app and a contact app, the confidence level corresponding to the message app may be 0.3, and the confidence level corresponding to the contact app may be 0.2. According to some embodiments, the domain classifier 811 may integrate the numeric values of the domain corresponding to the message application and the domain corresponding to the contact application and may assign 0.5, which is the integrated confidence level of the domains, to the message app.

In various embodiments, in the case where the highest confidence level among confidence levels of the determined plurality of domains does not exceed a critical value, the domain classifier 811 may integrate confidence levels of at least some of domains. However, even though the highest confidence level exceeds the critical value, the domain classifier 811 may integrate the numeric values of at least some of domains.

The intent classifier 812 may determine the intent in the domain determined by the domain classifier 811, based on at least one of the text corresponding to the user utterance or the context information. According to certain embodiments, the intent may correspond to an operation performed by using an app corresponding to a domain, and the intent classifier 812 may perform the operation of determining the rule ID as the operation of determining the intent.

According to some embodiments, the context information may include information (or information of an app being executed in background) of an app, which has been executed before the user utterance is entered, state information of the app, or the like.

According to various embodiments, in the case where the domain classifier 811 does not determine one domain, the intent classifier 812 may determine the intent in each of the plurality of domains.

According to certain embodiments, the intent classifier 812 may determine a plurality of intents. The intent classifier 812 may determine the intent based on the confidence level corresponding to each of intents. According to some embodiments, the sum of a plurality of confidence levels may be '1'.

According to various embodiments, the intent classifier 812 may be implemented with a plurality of models, and each intent classifier 812 implemented with the plurality of models may be used step by step. For example, the intent classifier 812 may include a first intent classifier implemented with a machine learning model and a second intent classifier implemented with a rule-based model. In certain embodiments, first of all, when the intent is determined by using the second intent classifier, the intent classifier 812 may use the determined intent; when the intent is not determined by using the second intent classifier, the intent classifier 812 may determine the intent by using the first intent classifier. According to some embodiments, since the intent is determined by using only the second intent classifier, the amount of computation may be reduced.

According to various embodiments, the intent classifier 812 may integrate confidence levels of at least some of intents among the determined plurality of intents.

According to certain embodiments, the intent classifier 812 may assign the integrated confidence level to the intent, which has the highest confidence level, from among target intents to be integrated.

In some embodiments, in the case where states corresponding to a first intent among a plurality of intents are the same as states corresponding to a second intent among the plurality of intents, the intent classifier 812 may integrate the confidence levels of the first intent and the second intent.

For example, in the case where the states corresponding to the first intent are state A, state B, and state C, and the states corresponding to the second intent are state A, state B, and state C, the intent classifier 812 may integrate the confidence levels of the first intent and the second intent and may assign the sum of the confidence level of the first intent and the confidence level of the second intent to the first intent or the second intent.

In various embodiments, in the case where states corresponding to a first intent among a plurality of intents include states corresponding to a second intent among the plurality of intents, the intent classifier 812 may integrate the confidence levels of the first intent and the second intent.

For example, in the case where the states corresponding to the first intent are state A, state B, state C, and state D, and the states corresponding to the second intent are state A, state B, and state C, the intent classifier 812 may integrate the confidence levels of the first intent and the second intent and may assign the integrated result to the first intent or the second intent.

In certain embodiments, each of a plurality of intents may have a group ID, and the intent classifier 812 may integrate the confidence levels of a plurality of intents, the group ID each of which is the same as each other.

For example, the intent classifier 812 may integrate the numerical values of the intents having group ID "A" among the determined plurality of intents and may assign the integrated value of the intents to the intent, which has the highest confidence level, from among intents having group ID "A".

In some embodiments, the relationship including a priority may be set in advance to a plurality of intents. The intent classifier 812 may combine values of intents having the relationship among the determined plurality of intents.

For example, In the first intent to block a call received from telephone number 'A' and the second intent to block a message received from telephone number 'A', the relationship in which a priority is assigned to the first intent may be set in advance. The intent classifier 812 may integrate the confidence levels of the first intent and the second intent and may assign the integrated confidence level of the intents to the first intent.

In various embodiments, in the case where the highest confidence level among confidence levels of the determined plurality of intents does not exceed a critical value, the intent classifier 812 may integrate confidence levels of at least some of intents. In certain embodiments, independently of the confidence levels of a plurality of intents, the intent classifier 812 may integrate the values of at least some of the intents.

In some embodiments, the intent classifier 812 may include an intent classifier of a deep learning type using AI technology such as machine learning or the like and an intent classifier of a rule-based type that matches user utterance foot-print corresponding to each path rule to determine the intent.

According to various embodiments, when the intent classifier of the rule-based type determines the intent in the domain determined by the domain classifier 811, the intent classifier of the deep learning type may not determine the intent separately. On the other hand, when the intent classifier of the deep learning type determines the intent, the intent classifier of the rule-based type may not determine the intent separately.

In certain embodiments, when the intent classifier of each type determines the intent, the slot tagger 813 and criteria handler 814 corresponding to each type may operate.

The slot tagger 813 may generate a slot necessary to perform a path rule, based on the text corresponding to the user utterance and the intent (or rule ID) determined by the intent classifier 812. According to some embodiments, in the case where the intent classifier 812 determines a plurality of intents, the slot tagger 813 may generate the slot for the plurality of intents.

According to various embodiments, the slot tagger 813 may generate a plurality of slots for each of intents. The slot tagger 813 may further determine the confidence level corresponding to each slot.

According to certain embodiments, the slot tagger 813 may include various types of slot taggers 813. For example, the slot tagger 813 may include a type of slot tagger for generating a slot in a user utterance based on the intent determined by the intent classifier of the deep learning type. For another example, the slot tagger 813 may include a type of slot tagger for generating a slot in a user utterance based on the intent determined by the intent classifier of the rule-based type.

According to some embodiments, the slot tagger 813 may include a plurality of slot taggers for generating a slot for each domain.

The criteria handler 814 may change a parameter, which the slot tagger 813 generates, to a format that a path planner module is capable of using. For example, the criteria handler 814 may change the slot of "yesterday" to data of "−1" that has the format of a date.

According to various embodiments, the NLU module 810 may be implemented with modules such as the domain classifier 811, the intent classifier 812, the slot tagger 813, and the criteria handler 814, and may be implemented with a module in which the modules are integrated.

The NLU module 810 may transmit the rule ID and the slot to the path planner module. The path planner module may change the slot to the parameter of the path rule, may generate the path rule by using the context information of the electronic apparatus, or the like, and may transmit the path rule to the electronic apparatus.

Figure 9A:
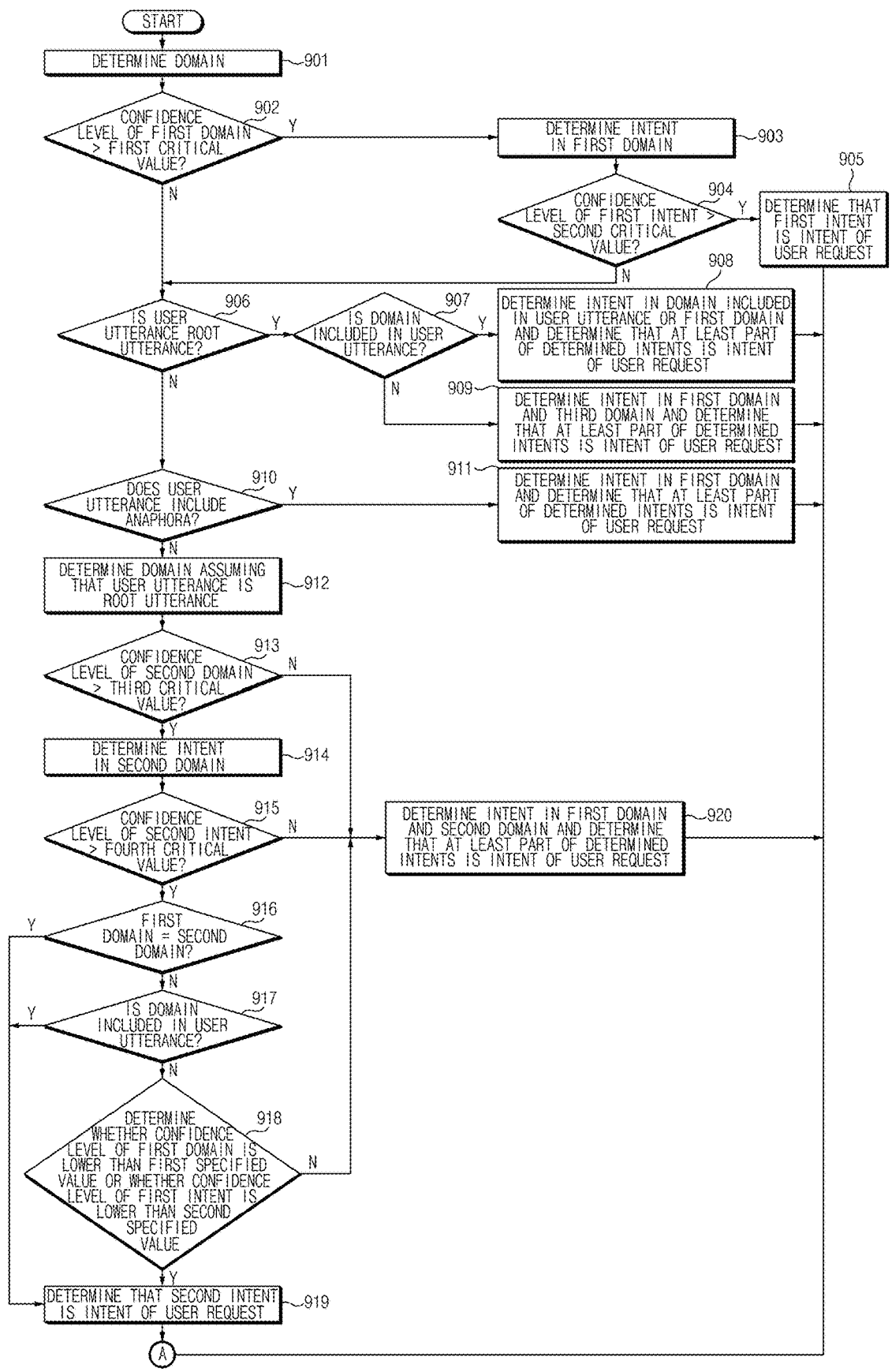
FIGS. 9A and 9B illustrate operations of a method in which an intelligence server generates a path rule, according to some embodiments.
Figure 9B:
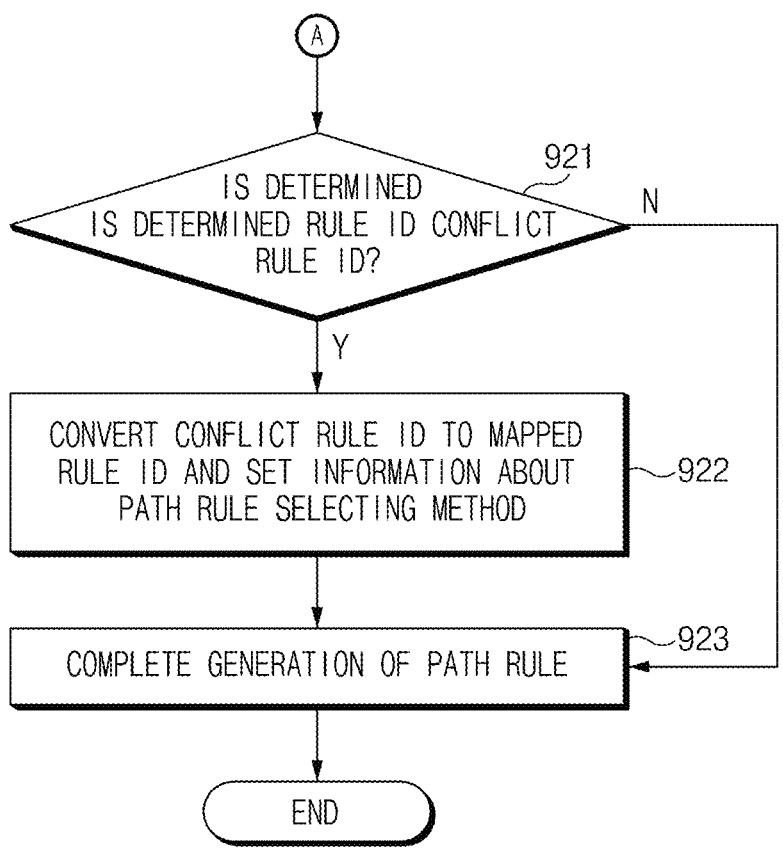

FIGS. 9A and 9B illustrate operations of a method in which an intelligence server (for example, intelligence server 200 of FIG. 4) generates a path rule, according to certain embodiments.

In some embodiments, the intelligence server 200 may include a communication interface connected to the network, a processor electrically connected to the communication interface, and a memory electrically connected to the processor.

Hereinafter, it is assumed that, in certain embodiments, the intelligence server 200 of FIG. 4 performs a process of FIGS. 9A and 9B. In addition, as described in the non-limiting example of FIGS. 9A and 9B, it is understood that the operation described as being executed by the intelligence server 200 is, according to certain embodiments, controlled by the processor of the intelligence server 200. The operation may be implemented with instructions (commands) capable of being performed (or executed) by the processor of the intelligence server 200.

In various embodiments, prior to operation 901, the processor of the intelligence server 200 may receive a user utterance input and context information from a user terminal and may obtain a text corresponding to the user utterance input.

According to various embodiments, certain of operations 901 to 923 of FIGS. 9A and 9B may not be performed. According to various embodiments, the order of operations 901 to 923 in FIGS. 9A and 9B may be changed.

Referring to FIG. 9A, in operation 901, the domain classifier 811 may determine one domain (or an app), based on at least one of a text corresponding to a user utterance or context information. According to certain embodiments, the domain classifier 811 may determine a domain based on the confidence level corresponding to each of at least one or more domains.

In operation 902, the processor of the intelligence server 200 may determine whether the confidence level of a first domain, which has the highest confidence level, from among at least one or more domains exceeds a first critical value.

In the case where the result of operation 902 indicates that the confidence level of the first domain exceeds the first critical value, in operation 903, the intent classifier 812 may determine at least one intent in the first domain based on at least one of a text corresponding to the user utterance or context information. According to some embodiments, the intent classifier 812 may perform an operation of determining at least one rule ID in the first domain, as an operation of determining the intent. According to various embodiments, the intent classifier 812 may determine the intent based on the confidence level corresponding to each of at least one or more intents.

In operation 904, the processor of the intelligence server 200 may determine whether the confidence level of the first intent, which has the highest confidence level, from among at least one or more intents in the first domain, exceeds a second critical value.

In the case where the result of operation 904 indicates that the confidence level of the first intent exceeds the second critical value, in operation 905, the processor of the intelligence server 200 may determine that the first intent is the intent of a user request (or user utterance input).

In the case where the result of operation 902 indicates that the confidence level of the first domain does not exceed the first critical value or in the case where the result of operation 904 indicates that the confidence level of the first intent does not exceed the second critical value, in operation 906, the processor of the intelligence server 200 may determine whether the user utterance is a root utterance, by using context information. In certain embodiments, when the user terminal 100 is displaying a home screen, the screen of an intelligence service app, the screen of an app that does not support an intelligence service, a lock screen, or the like, the root utterance may mean a user utterance received after an intelligence service is executed. According to some embodiments, the context information may include information of an app that has been executed before the intelligence service is performed, and the processor of the intelligence server 200 may determine whether the user utterance is the root utterance, by using the context information.

In the case where the result of operation 906 indicates that the user utterance is the root utterance, in operation 907, the processor of the intelligence server 200 may determine whether a domain (or app) is included (or mentioned) in the user utterance. In various embodiments, the processor of the intelligence server 200 may determine whether the domain is included in the user utterance, by using a result that the domain classifier 811 determines, or by determining whether there is a domain name (or app name) matched to a text corresponding to the user utterance.

In the case where the result of operation 907 indicates that the domain (or app) is included (or mentioned) in the user utterance, in operation 908, the intent classifier 812 may determine at least one intent in the domain included in the user utterance or the first domain, based on at least one of a text corresponding to the user utterance or context information. According to certain embodiments, the intent classifier 812 may perform an operation of determining at least one rule ID in the domain included in the user utterance, as an operation of determining the intent. According to some embodiments, the intent classifier 812 may determine the intent based on the confidence level corresponding to each of at least one or more intents. In operation 908, the processor of the intelligence server 200 may determine that intents of specified number, which have a high confidence level, from among the determined at least one or more intents are the intent of the user request. For example, the processor of the intelligence server 200 may determine that intents, which correspond to top four in descending order of confidence levels, from among five intents in the domain included in the user utterance or the first domain are the intent of the user request.

In the case where the result of operation 907 indicates that the domain (or app) is not included (or mentioned) in the user utterance, in operation 909, the intent classifier 812 may determine at least one intent in the first domain of the highest confidence level and a third domain of the second highest confidence level, based on at least one of a text corresponding to the user utterance or the context information. According to various embodiments, the intent classifier 812 may perform an operation of determining at least one rule ID in the first domain and at least one rule ID in the third domain, as an operation of determining the intent. According to certain embodiments, the intent classifier 812 may determine the intent based on the confidence level corresponding to each of at least one or more intents.

In the case where the result of operation 906 indicates that the user utterance is not the root utterance, in operation 910, the processor of the intelligence server 200 may determine whether a text corresponding to the user utterance input includes an anaphora.

According to some embodiments, the intent determined by the intent classifier 812 may have a confidence level associated with whether the anaphora is included; in the case where the confidence level associated with whether the anaphora is included exceeds a critical value, the processor of the intelligence server 200 may determine that the anaphora is included in a text corresponding to a user utterance input.

For example, in the case where the text corresponding to the user utterance input is "send this photo by using a message", since 'this' is an anaphora, the processor of the intelligence server 200 may determine that the text corresponding to the user utterance input includes the anaphora.

In the case where the result of operation 910 indicates that the text corresponding to the user utterance input includes the anaphora, in operation 911, the intent classifier 812 may determine at least one intent in the first domain based on at least one of a text corresponding to the user utterance or context information. According to various embodiments, the intent classifier 812 may perform an operation of determining at least one rule ID in the first domain, as an operation of determining the intent. According to certain embodiments, the intent classifier 812 may determine the intent based on the confidence level corresponding to each of at least one or more intents.

According to some embodiments, in operation 911, the intent classifier 812 may determine at least one intent in the third domain corresponding to an app, which a user terminal has executed before the intelligence service is performed, based on at least one of the text corresponding to the user utterance or the context information. For example, in the case where the app that the user terminal has executed before the intelligence service is performed is a gallery app, the intent classifier 812 may determine at least one intent in a gallery app.

In operation 911, the processor of the intelligence server 200 may determine that intents of specified number, which have a high confidence level, from among the determined at least one or more intents are the candidate of the intent of the user request.

In the case where the result of operation 910 indicates the text corresponding to the user utterance input does not include the anaphora, in operation 912, the domain classifier 811 may determine at least one domain (or an app) based on the user utterance, assuming that the user utterance is the root utterance. According to various embodiments, the domain classifier 811 may determine a domain based on the confidence level corresponding to each of at least one or more domains.

In operation 913, the processor of the intelligence server 200 may determine whether the confidence level of the second domain, which has the highest confidence level, from among domains determined assuming that the user utterance is the root utterance exceeds a third critical value.

In the case where the result of operation 913 indicates that the confidence level of the second domain exceeds the third critical value, in operation 914, the intent classifier 812 may determine at least one intent in the second domain based on at least one of a text corresponding to the user utterance or the context information. According to certain embodiments, the intent classifier 812 may perform an operation of determining at least one rule ID in the second domain, as an operation of determining the intent. According to some embodiments, the intent classifier 812 may determine the intent based on the confidence level corresponding to each of at least one or more intents.

In operation 915, the processor of the intelligence server 200 may determine whether the confidence level of the second intent, which has the highest confidence level, from among at least one or more intents in the second domain exceeds a fourth critical value.

In the case where the result of operation 915 indicates that the confidence level of the second intent exceeds the fourth critical value, in operation 916, the processor of the intelligence server 200 may determine whether the first domain is the same as the second domain.

In the case where the result of operation 916 indicates that the first domain is not the same as the second domain, in operation 917, the processor of the intelligence server 200 may determine whether a domain (or app) is included (or mentioned) in the user utterance. In various embodiments, the processor of the intelligence server 200 may determine whether the domain is included in the user utterance, by using a result that the domain classifier 811 determines, or by determining whether there is a domain name (or app name) matched to a text corresponding to the user utterance.

In the case where the result of operation 917 indicates that the domain is not included in the user utterance, in operation 918, the processor of the intelligence server 200 may determine whether the confidence level of the first domain is lower than a first specified value or whether the confidence level of the first intent is lower than a second specified value.

In the case where the result of operation 918 indicates that the confidence level of the first domain is lower than the first specified value or the confidence level of the first intent is lower than the second specified value (e.g., including the case where the confidence level of the first domain is lower than the first specified value and the confidence level of the first intent is lower than the second specified value, the case where the confidence level of the first domain is lower than the first specified value and the confidence level of the first intent is higher than the second specified value, and the case where the confidence level of the first domain is higher than the first specified value and the confidence level of the first intent is lower than the second specified value), in operation 919, the processor of the intelligence server 200 may determine that the second intent is the intent of a user request.

In the case where the result of operation 916 indicates that the first domain is the same as the second domain, in operation 919, the processor of the intelligence server 200 may determine that the second intent is the intent of a user request.

In the case where the result of operation 917 indicates that the domain is included in the user utterance, in operation 919, the processor of the intelligence server 200 may determine that the second intent is the intent of a user request.

In the case where the result of operation 913 indicates that the confidence level of the second domain does not exceed the third critical value, in the case where the result of operation 915 indicates that the confidence level of the second intent does not exceed the fourth critical value, or in the case where the result of operation 918 indicates that the confidence level of the first domain is not lower than the first specified value or the confidence level of the first intent is not lower than the second specified value, operation 920 may be performed. In operation 920, the intent classifier 812 may determine at least one intent in the first domain and at least one intent in the second domain, based on at least one of the text corresponding to the user utterance or the context information. According to certain embodiments, the intent classifier 812 may perform an operation of determining at least one rule ID in the first domain and at least one rule ID in the second domain, as an operation of determining the intent. According to some embodiments, the intent classifier 812 may determine at least one rule ID in only the first domain, as an operation of determining the intent. According to various embodiments, the intent classifier 812 may perform an operation of determining at least one rule ID in only the second domain. According to certain embodiments, the intent classifier 812 may determine the intent based on the confidence level corresponding to each of at least one or more intents.

In operation 920, the processor of the intelligence server 200 may determine that intents of specified number, which have a high confidence level, from among at least one or more intents in the first domain and intents of specified number, which have a high confidence level, from among at least one or more intents in the second domain are the intent of the user request.

For example, the processor of the intelligence server 200 may determine that intents, which correspond to top two in descending order of confidence levels, from among five intents in the first domain and intents, which correspond to top two in descending order of confidence levels, from among four intents in the second domain are the intent of the user request.

According to some embodiments, in operation 920, the intent classifier 812 may determine at least one intent in the first domain and at least one intent in the third domain corresponding to an app, which a user terminal has executed before the intelligence service is performed, based on at least one of the text corresponding to the user utterance or the context information. According to various embodiments, In operation 920, the processor of the intelligence server 200 may determine that intents of specified number, which have a high confidence level, from among at least one or more intents in the first domain and intents of specified number, which have a high confidence level, from among at least one or more intents in the third domain are the intent of the user request.

In certain embodiments, the rule ID that the processor of the intelligence server 200 determines may include a conflict rule ID. The conflict rule ID is a rule ID including a plurality of rule IDs since the intent associated with the user utterance input is not determined.

Referring to FIG. 9B, in operation 921, the processor of the intelligence server 200 may determine whether the rule ID corresponding to the intent of a user request is the conflict rule ID.

In the case where the result of operation 921 indicates that the rule ID corresponding to the intent of the user request is the conflict rule ID, in operation 922, the processor of the intelligence server 200 may convert the conflict rule ID to the mapped rule ID. In addition, the processor of the intelligence server 200 may set information about a path rule selecting method.

For example, the conflict rule ID may include a rule ID for editing a photo using a gallery app, a rule ID for editing a photo using a 360 photo editing app, and a rule ID for editing a photo using a moving picture editing app. The processor of the intelligence server 200 may convert the conflict rule ID to a plurality of rule IDs mapped to each rule ID.

In some embodiments, the processor of the intelligence server 200 may select one path rule by using the context information of the user terminal 100 and may set information about a path rule selecting method for receiving a selection input in the case where one path rule is not capable of being selected by using the context information.

In various embodiments, in the case where the processor of the intelligence server 200 generates a plurality of path rules by using a plurality of rule IDs converted from the conflict rule ID, the processor of the intelligence server 200 may set a path rule such that the user terminal 100 selects one path rule among a plurality of path rules by using the context information.

In this case, in certain embodiments, the user terminal 100 may receive a plurality of path rules generated by using the conflict rule ID including the rule ID for editing a photo using a gallery app, the rule ID for editing a photo using a 360 photo editing app, and the rule ID for editing a photo using a moving picture editing app. In the case where the user terminal 100 receives the plurality of path rules while displaying a 360 photo in the display, the user terminal 100 may execute a path rule corresponding to the rule ID for editing a photo by using a 360 photo editing app corresponding to the context information.

In some embodiments, in the case where the processor of the intelligence server 200 generates a plurality of path rules by using a plurality of rule IDs converted from the conflict rule ID, the processor of the intelligence server 200 may further set a path rule such that the user terminal 100 performs one path rule, which is selected by a user, from among a plurality of path rules. In this case, in various embodiments, the user terminal 100 may receive a plurality of path rules generated by using the conflict rule ID including the rule ID for editing a photo using a gallery app, the rule ID for editing a photo using a 360 photo editing app, and the rule ID for editing a photo using a moving picture editing app. In this case, the user terminal 100 may obtain a user input to select one path rule among three path rules and may perform a path rule corresponding to the user input.

In certain embodiments, the processor of the intelligence server 200 may allow the user terminal 100 to select a path rule by using the context information or may allow the user terminal 100 to perform one path rule selected by the user. In this case, the user terminal 100 may obtain a user input to select one path rule only in the case where the path rule is not capable of being selected by using the context information.

In the case where the result of operation 921 indicates that the rule ID corresponding to the intent of the user request is the conflict rule ID, in operation 923 after operation 922, the processor of the intelligence server 200 may complete the generation of path rules by using a rule ID mapped to the conflict rule ID and a user utterance. In some embodiments, the user terminal 100 performs the path rule generated by using the rule ID mapped to the conflict rule ID and the user utterance, the user terminal 100 may perform one of a plurality of path rules by using the context information or may output a screen for selecting a path rule to perform the selected path rule.

In the case where the result of operation 921 indicates that the rule ID corresponding to the intent of a user request is not the conflict rule ID, in operation 923, the intelligence server 200 may complete the generation of the path rule by using the intent (or rule ID) determined in operation 905, operation 908, operation 909, operation 911, operation 919, or operation 920 and the user utterance.

According to various embodiments, the personal information server 300 may include a white list DB 310 including data associated with a request preferred by a user and a black list DB 320 including data associated with a request not preferred by a user. According to certain embodiments, the personal information server 300 may be included in the intelligence server 200 or may be implemented separately.

Figure 10A:
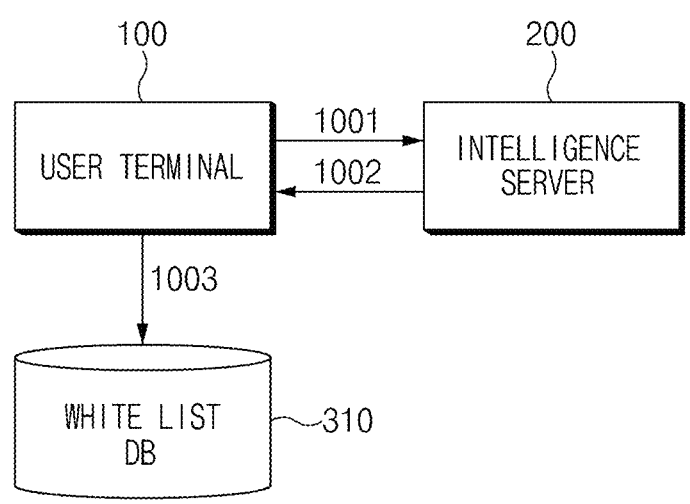
FIG. 10A illustrate aspects of how a white list database of a personal information server is updated according to various embodiments.
Figure 10B:
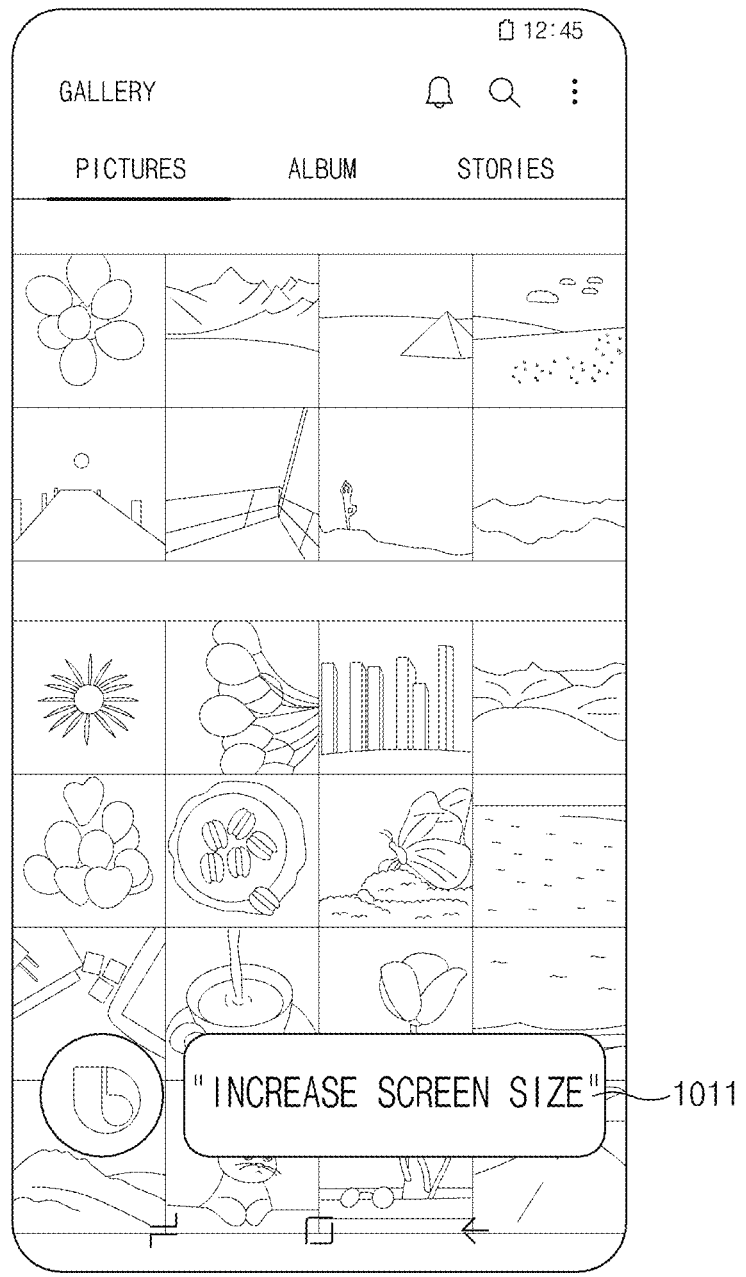
FIG. 10B illustrate aspects of how a user utterance is entered according to certain embodiments.
Figure 10C:
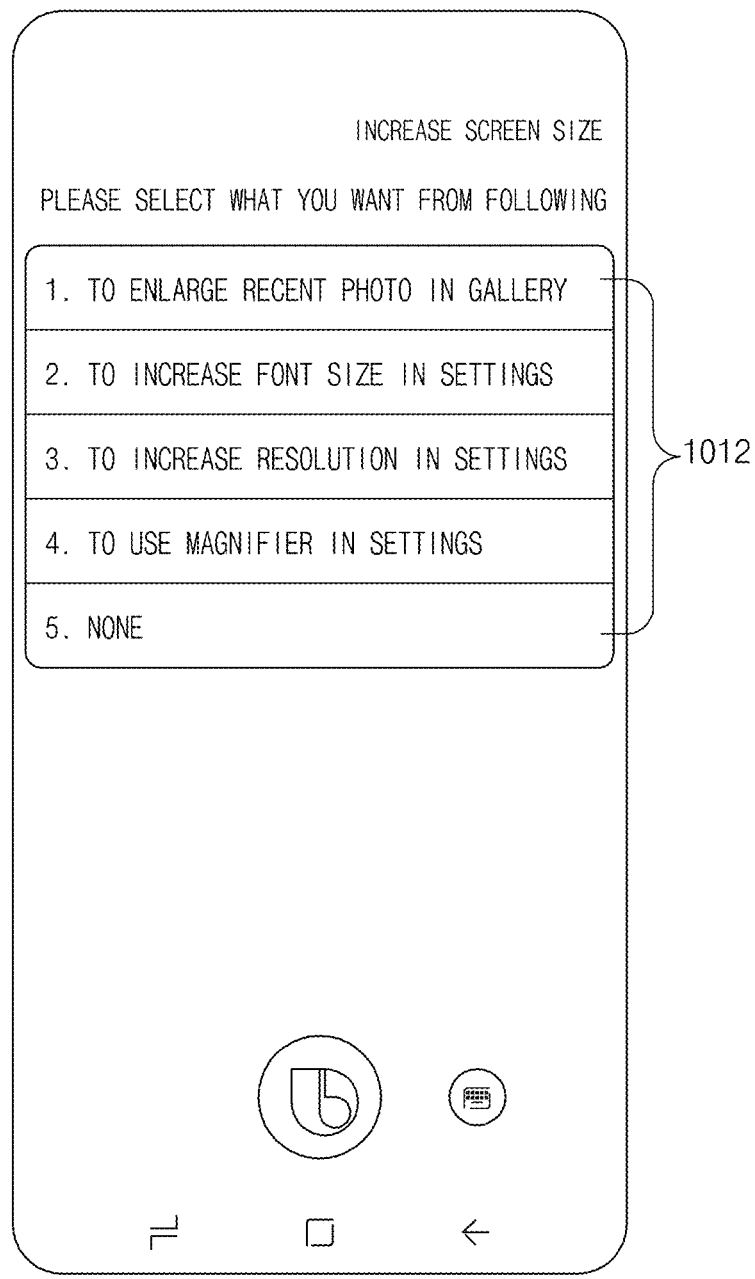
FIG. 10C illustrates a screen in which a text corresponding to a plurality of path rules is displayed according to some embodiments.

FIG. 10A is a view illustrating how a white list database of a personal information server is updated, according to some embodiments. FIG. 10B is a view illustrating how a user utterance is entered, according to various embodiments. FIG. 10C is a view illustrating a screen in which a text corresponding to a plurality of path rules is displayed, according to certain embodiments.

In operation 1001, the user terminal 100 may transmit data associated with the obtained user utterance input to the intelligence server 200. The user utterance input may include a first request for performing a first task using the electronic apparatus.

For example, referring to FIG. 10B, the user terminal 100 may obtain a user utterance input 1011 saying that "increase the size of the screen" and the user terminal 100 may transmit data associated with the obtained user utterance input to the intelligence server 200.

In operation 1002, the processor of the intelligence server 200 may generate a plurality of path rules by using the data associated with the received user utterance input and may transmit a response including the plurality of path rules to the user terminal 100.

In some embodiments, the processor of the intelligence server 200 may generate the path rule in the manner described with reference to FIGS. 9A and 9B.

In various embodiments, the plurality of path rules may include information about a plurality of second requests for performing a second task the same as, similar to, or different from the first task.

In operation 1003, the user terminal 100 may obtain a user input for selecting one of a plurality of path rules and may transmit the data associated with the selected path rule to the personal information server 300. The personal information server 300 may add data associated with the selected path rule to the white list DB. According to certain embodiments, the data associated with the selected path rule may include at least one of context information (e.g., app information, state information of the app, or the like) at a point in time when the user terminal 100 receives the user utterance input, the intent (or rule ID) of the selected path rule, a text corresponding to a user utterance input, a text, which corresponds to the intent, in the text corresponding to the user utterance input, or a domain (or an app) of the selected path rule.

For example, as illustrated in FIG. 10C, the user terminal 100 may output a screen displaying a text 1012 indicating a plurality of path rules and may obtain a user input to select one of the plurality of texts. The user terminal 100 may transmit data associated with the path rules corresponding to the selected text to the intelligence server 200 or the personal information server 300.

According to some embodiments, in the case where the user terminal 100 receives a plurality of path rules, the user terminal 100 may output a screen as illustrated in FIG. 10C. According to various embodiments, in the case where the user terminal 100 receives one path rule, the user terminal 100 may immediately perform the received path rule instead of outputting a screen as illustrated in FIG. 10C.

In certain embodiments, the white list DB may include a white list of requests including data associated with the selected path rule.

According to some embodiments, each request in the white list includes at least one of a white list identifier for identification in the white list, context information (e.g., app information, state information of the app, or the like) of the user terminal 100, the intent (or a rule ID) of the path rule corresponding to each request, a text corresponding to a user utterance input, a tagged utterance text, or a domain (or an app) of a selected path rule.

In various embodiments, the tagged utterance text (hereinafter referred to as a "tagged utterance text") may be a text corresponding to the rule ID in the text corresponding to the user utterance input. In other words, the tagged utterance text may be a text excluding the text corresponding to the parameter in the text corresponding to the user utterance input. For example, the text corresponding to the user utterance input may be "search for Hawaii photos and send the Hawaii photos to mom" and the intent may be searching for the Hawaii photos over the Internet and may send the found result by using a message app. For example, the tagged utterance text may be "search for something and send something to".

In certain embodiments, the tagged utterance text may include tag information (e.g., type information of a parameter). In the above example, the tagged utterance text including the tag information may be "search for a search word and send the found result to a recipient". In an example, the recipient and the search word may correspond to the type information of a parameter.

For another example, the text corresponding to the user utterance input may be "search for Hawaii photos and send the Hawaii photos to mom" and the intent may be searching for the Hawaii photos in a gallery and send the found result by using a message app. For example, the tagged utterance text may be "search for a photo and send the photo to".

Figure 11A:
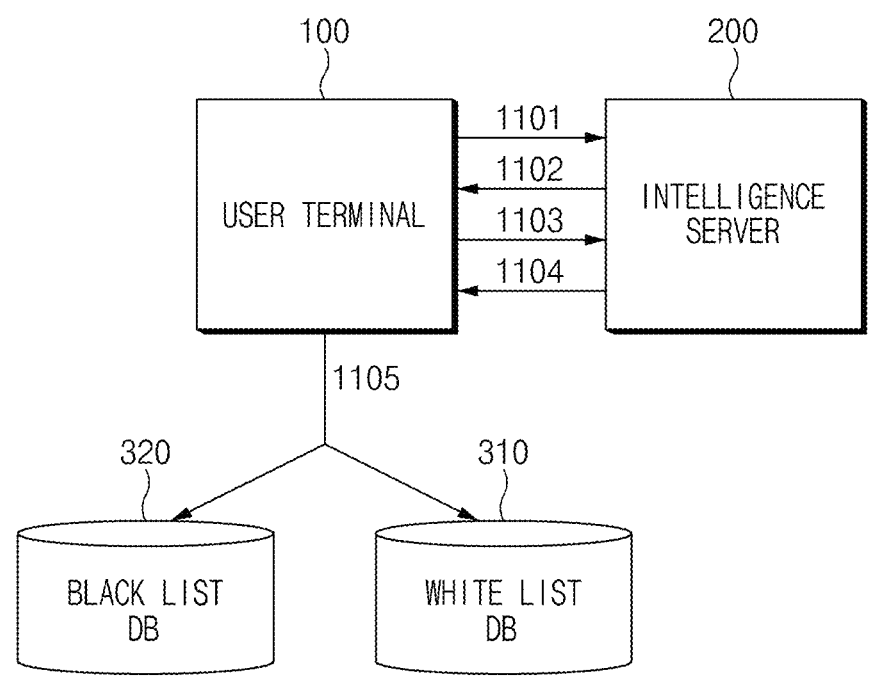
FIG. 11A illustrates aspects of how a white list database and a black list database of a personal information server are updated according to various embodiments.

FIG. 11A is a view illustrating how a white list database and a black list database of the personal information server 300 are updated, according to some embodiments.

Figure 11B:
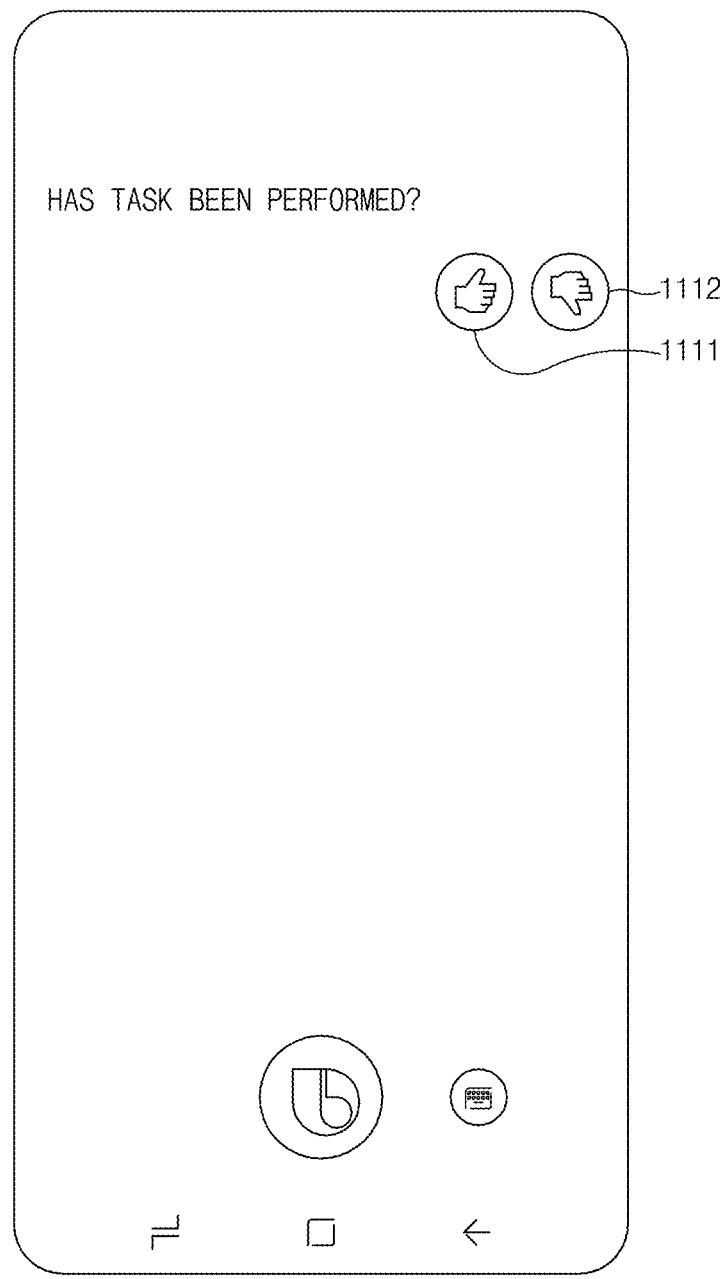
FIG. 11B illustrates a screen in which an electronic apparatus receives a feedback input according to certain embodiments.

FIG. 11B is a view illustrating a screen in which an electronic apparatus receives a feedback input, according to various embodiments.

In operation 1101, the user terminal 100 may transmit data associated with the obtained user utterance input to the processor of the intelligence server 200. The user utterance input may include a first request for performing a first task using the electronic apparatus.

In operation 1102, the processor of the intelligence server 200 may generate a path rule by using the data associated with the received user utterance input and may transmit a response including the path rule to the user terminal 100. The user terminal 100 may execute the path rule included in the received response.

In certain embodiments, the processor of the intelligence server 200 may generate the path rule in the manner described with reference to FIGS. 9A and 9B.

In operation 1103, the user terminal 100 may receive a user input corresponding to the feedback associated with the executed path rule and the user input may correspond to a negative feedback. The user terminal 100 may transmit data associated with a user input corresponding to the negative feedback to the intelligence server 200.

In some embodiments, after executing the path rule, the user terminal 100 may display a screen as illustrated in FIG. 11B in the display and may receive the feedback input. For example, through a microphone, the user terminal 100 may receive a positive feedback such as "good", "yes", or the like or may receive a negative feedback such as "not this", "no", "other", or the like.

For another example, through the touchscreen display, the user terminal 100 may receive a touch input for selecting a first object 1111 corresponding to a positive feedback input or may receive a touch input for selecting a second object 1112 corresponding to a negative feedback input.

In operation 1104, the processor of the intelligence server 200 may generate a plurality of path rules by using the data associated with the user utterance input and may transmit a response including the plurality of path rules to the user terminal 100.

According to various embodiments, the generated plurality of path rules may not include a path rule received in operation 1102.

In operation 1105, the user terminal 100 may obtain a user input for selecting one of a plurality of path rules and may transmit data associated with the path rule received in operation 1102 and data associated with the selected path rule, to the personal information server 300. The personal information server 300 may add the data associated with the path rule received in operation 1102 and the data associated with the selected path rule to the black list DB and the white list DB.

According to certain embodiments, the data associated with the selected path rule received in operation 1102 may include at least one of context information (e.g., app information, state information of the app, or the like) at a point in time when the user terminal 100 receives the user utterance input, the intent (or rule ID) of the path rule received in operation 1102, the intent (or rule ID) of the selected path rule, a text corresponding to a user utterance input, the tagged utterance text, which is received in operation 1102, in the text corresponding to the user utterance input, or a domain (or app) of the path rule received in operation 1102.

In some embodiments, the black list DB may include a black list of requests including the data associated with the path rule received in operation 1102 and the data associated with the selected path rule.

According to various embodiments, each request in the black list may include at least one of a black list identifier for identification in the black list, context information (e.g., app information, state information of the app, or the like) of the user terminal 100, the intent (or rule ID) of the path rule received in operation 1102, a text corresponding to the user utterance input, the tagged utterance text, which is received in operation 1102, in the text corresponding to the user utterance input, a domain (or app) of the path rule corresponding to each request, or the intent (or rule ID) of the selected path rule.

According to certain embodiments, the data associated with the selected path rule may include at least one of context information (e.g., app information, state information of the app, or the like) at a point in time when the user terminal 100 receives the user utterance input, the intent (or rule ID) of the selected path rule, a text corresponding to a user utterance input, a tagged utterance text, or a domain (or an app) of the selected path rule.

In some embodiments, the white list DB may include a white list of requests including data associated with the selected path rule.

According to various embodiments, each request in the white list includes at least one of a white list identifier for identification in the white list, context information (e.g., app information, state information of the app, or the like) of the user terminal 100, the intent (or a rule ID) of the path rule corresponding to each request, a text corresponding to a user utterance input, a tagged utterance text, or a domain (or an app) of a selected path rule.

According to certain embodiments, before operation 1104, after the user terminal 100 receives a user input corresponding to a feedback associated with the executed path rule, the user terminal 100 may transmit data associated with the path rule received in operation 1102 to the personal information server 300. According to some embodiments, the personal information server 300 may add the data associated with the path rule received in operation 1102, to the black list DB. In this case, in operation 1105, the personal information server 300 may add the intent (or rule ID) of the selected path rule to the black list DB.

According to various embodiments, in operation 1001 to operation 1003 and in operation 1101 to operation 1105, the operation performed by the intelligence server 200 and the personal information server 300 may be performed by the user terminal 100.

Hereinafter, a method in which the intelligence server 200 provides a response by using the white list and the black list will be described with reference to FIGS. 12 and 13.

Figure 12:
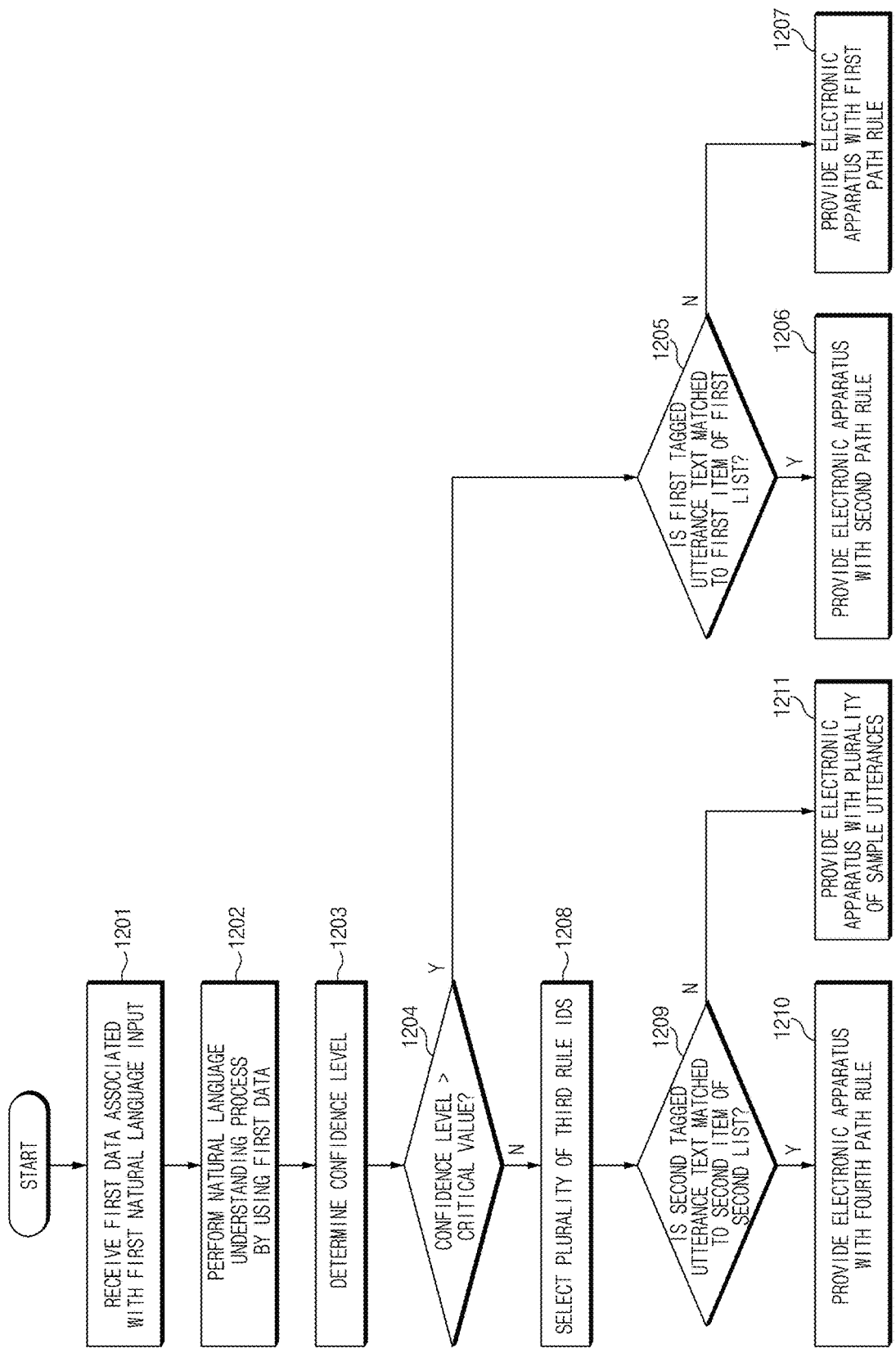
FIG. 12 illustrates operations of a method in which an intelligence server provides a response to an electronic apparatus according to some embodiments.

FIG. 12 is a flowchart illustrating a method in which the intelligence server 200 provides a response to the user terminal 100, according to various embodiments.

In operation 1201, the processor of the intelligence server 200 may receive first data associated with the first user utterance input, from the user terminal 100. In certain embodiments, the first data may include a voice signal corresponding to the first user utterance input and context information of the user terminal 100 at a point in time when the first user utterance input is received. According to some embodiments, the context information may include at least one of information about an app that the user terminal 100 is performing when the first user utterance input is received or state information of the app.

In operation 1202, the processor of the intelligence server 200 may perform a natural language understanding process by using the first data associated with the first user utterance input. In various embodiments, the processor of the intelligence server 200 may determine one or more rule IDs by performing the natural language understanding process using a method described with reference to FIGS. 8 to 9B.

According to certain embodiments, the processor of the intelligence server 200 may determine one or more domains or one or more rule IDs by performing the natural language understanding process.

In operation 1203, the processor of the intelligence server 200 may determine the confidence level from the natural language understanding process. According to some embodiments, the processor of the intelligence server 200 may determine the confidence level corresponding to each determined domain or the confidence level corresponding to each rule ID. According to various embodiments, operation 1203 may be performed while operation 1202 is performed. For example, the processor of the intelligence server 200 may determine the confidence level corresponding to each domain or the confidence level corresponding to each rule ID while performing the natural language understanding process.

In operation 1204, the processor of the intelligence server 200 may determine whether the confidence level exceeds a critical value. In certain embodiments, the processor of the intelligence server 200 may determine whether the confidence level corresponding to each of the determined domains exceeds the critical value. In some embodiments, the processor of the intelligence server 200 may determine whether the confidence level corresponding to each of the determined rule IDs exceeds the critical value. In various embodiments, the processor of the intelligence server 200 may determine whether the confidence level corresponding to each of domains exceeds the critical value and the confidence level corresponding to each of rule IDs exceeds the critical value.

According to certain embodiments, the processor of the intelligence server 200 may determine whether the highest confidence level among confidence levels of one or more domains exceeds the critical value. According to some embodiments, the processor of the intelligence server 200 may determine whether the highest confidence level among confidence levels of one or more rule IDs exceeds the critical value.

According to various embodiments, whether the confidence level exceeds the critical value may correspond to whether the intent (or rule ID) of the user request determined in the operations described with reference to FIGS. 9A and 9B is one. For example, the fact that the intent (or rule ID) of the determined user request is one may be that the confidence level exceeds the critical value. For another example, the fact that there are a plurality of intents (or rule ID) of the determined user request may be that the confidence level does not exceed the critical value.

In the case where the result of operation 1204 indicates that the confidence level exceeds the critical value, in operation 1205, the processor of the intelligence server 200 may determine whether a first item to which the first tagged utterance text based on the first user utterance input and the first rule ID is matched is in the first list being a list of first items stored in advance.

According to certain embodiments, the first rule ID may be the rule ID having the highest confidence level among the rule IDs determined in operation 1202. According to some embodiments, the tagged utterance text may be a text corresponding to a rule ID in a text corresponding to the user utterance input.

In various embodiments, the processor of the intelligence server 200 may determine whether the first item to which both the obtained first tagged utterance text and context information included in the first data are matched is in the first list.

According to certain embodiments, the first list may correspond to a black list described with reference to FIG. 11, and the first item may include information associated with a path rule in which a negative feedback is received from a user. For example, the first item may include at least one of context information of the user terminal 100 at a point in time when the negative feedback is received, a first black list rule ID of the path rule in which the negative feedback is received, a text corresponding to a user utterance, a tagged utterance text, or a first white list rule ID being a rule ID of the path rule selected after the negative feedback is received.

In the case where the result of operation 1205 indicates that the first item to which a first tagged utterance text based on the first user utterance input and the first rule ID is matched is in the first list, in operation 1206, the processor of the intelligence server 200 may provide the user terminal 100 with a second path rule based on the first data and a first white list rule ID included in the first item to which the first tagged utterance text is matched.

In the case where the result of operation 1205 indicates that the first item to which a first tagged utterance text based on the first user utterance input and the first rule ID is matched is not in the first list, in operation 1207, the processor of the intelligence server 200 may provide the user terminal 100 with a first path rule based on the first data and a first rule ID.

In the case where the result of operation 1204 indicates that the confidence level does not exceed a critical value, in operation 1208, the processor of the intelligence server 200 may determine third rule IDs, which is at least part of a rule ID, from among a plurality of rule IDs determined in operation 1202. In some embodiments, the processor of the intelligence server 200 may select third rule IDs of a specified number in descending order of confidence levels among a plurality of rule IDs determined in operation 1202.

In operation 1209, the processor of the intelligence server 200 may determine whether a second item to which a plurality of second tagged utterance texts based on the first user utterance input and the plurality of third IDs is matched is in a second list being a list of second items stored in advance.

According to various embodiments, the second list may correspond to a white list described with reference to FIG. 10A, and the second item may include information associated with a path rule selected from a user in an operation in which the user terminal 100 selects a plurality of path rules. For example, the second item may include at least one of context information of the user terminal 100 at a point in time when a path rule is selected, a second white list rule ID being a rule ID of the selected path rule, a text corresponding to a user utterance, or a tagged utterance text.

According to certain embodiments, the processor of the intelligence server 200 may obtain a plurality of second tagged utterance texts by using the first user utterance input and the plurality of third rule IDs and may determine whether the second item to which the obtained plurality of second tagged utterance texts are matched is in the second list.

According to some embodiments, the processor of the intelligence server 200 may determine whether the second item to which both the obtained second tagged utterance text and context information included in the first data are matched is in the second list.

In the case where the result of operation 1209 indicates that the second item to which a second tagged utterance text based on the first user utterance input and the third rule ID is matched is in the second list, in operation 1210, the processor of the intelligence server 200 may provide the user terminal 100 with a fourth path rule based on the first data and a second white list rule ID included in the second item to which the second tagged utterance text is matched.

In the case where the result of operation 1209 indicates that the second item to which a second tagged utterance text based on the first user utterance input and the third rule ID is matched is not in the second list, in operation 1211, the processor of the intelligence server 200 may provide the user terminal 100 with a plurality of sample utterances indicating a plurality of third path rules based on the first data and each of a plurality of third rule IDs. For example, a sample utterance indicating a path rule that searches for Hawaii photos in the gallery and sends the found Hawaii photos to Mom by using a message app may be "send a Hawaii photo to Mom by using a message app." According to various embodiments, the user terminal 100 may provide a user with a plurality of sample utterances indicating the received plurality of third path rules and may receive an input for selecting one of a plurality of sample utterances.

In certain embodiments, the processor of the intelligence server 200 may further provide the user terminal 100 with a plurality of third path rules.

Figure 13:
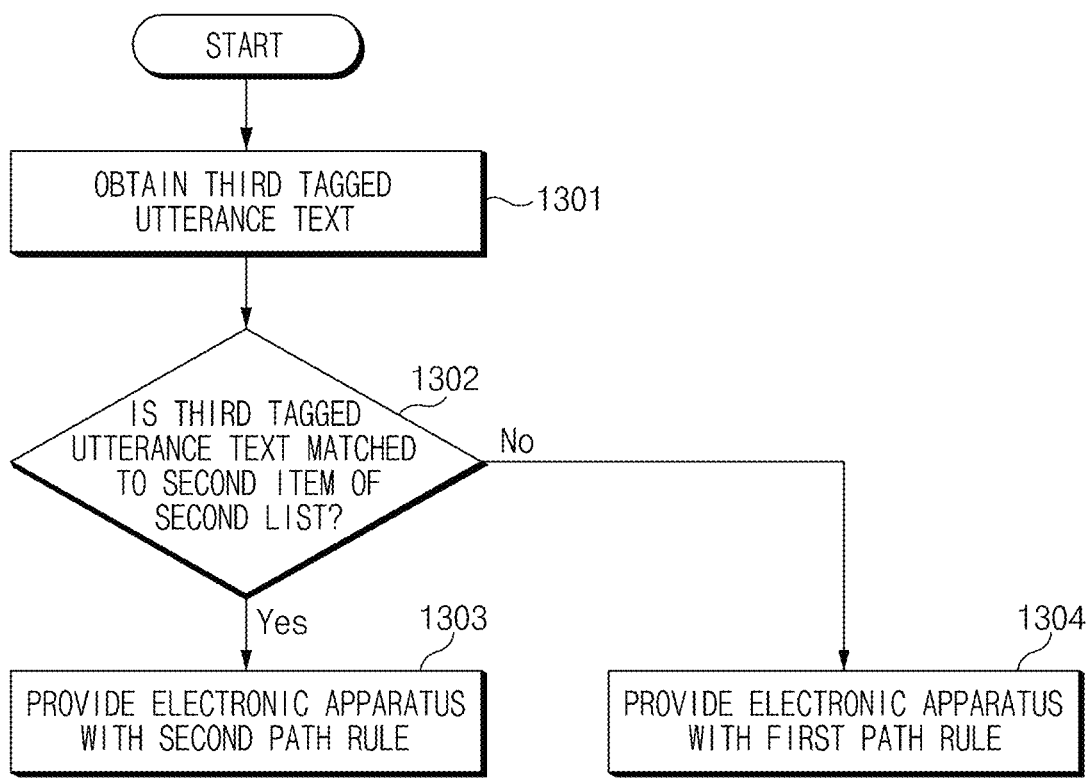
FIG. 13 illustrates operations of an additional process in which an intelligence server provides a response to an electronic apparatus according to various embodiments.

FIG. 13 is a flowchart illustrating an additional process in which the intelligence server 200 provides a response to the user terminal 100, according to some embodiments.

According to various embodiments, in the case where the result of operation 1205 indicates that a first item to which a first tagged utterance text based on a first user utterance input and a first rule ID is matched is in a first list, operations of FIG. 13 may be performed.

In operation 1301, the processor of the intelligence server 200 may obtain a third tagged utterance text based on the first user utterance input and first white list rule ID.

In operation 1302, the processor of the intelligence server 200 may determine whether a second item to which the obtained third tagged utterance text is matched is in the second list.

According to certain embodiments, the processor of the intelligence server 200 may determine whether the second item to which both the obtained third tagged utterance text and context information included in the first data are matched is in the second list.

In the case where the result of operation 1302 indicates that the second item matched to the third tagged utterance text is in the second list, in operation 1303, the processor of the intelligence server 200 may provide the user terminal 100 with a second path rule based on the first data and a first white list rule ID included in the first item to which the tagged utterance text is matched.

In the case where the result of operation 1302 indicates that the second item matched to the third tagged utterance text is not in the second list, in operation 1304, the processor of the intelligence server 200 may provide the user terminal 100 with a first path rule based on the first data and a first rule ID.

Hereinafter, the embodiment of operation 1301 to operation 1304 will be described.

In some embodiments, it is assumed that a first list includes a tagged utterance text saying that "search for and send to" and a first item including a first white list rule ID for searching for something in a gallery and sending the found result by using a message app.

In various embodiments, it is assumed that a second list includes a tagged utterance text saying that "search for a photo and send the photo to" and a second item including a second white list rule ID for searching for the photo in the gallery and sending the found photo by using a message app and does not include an item including a tagged utterance text saying that "search for a video and send the video to".

In certain embodiments, the processor of the intelligence server 200 may receive data associated with the first user utterance input saying that "search for and send a Hawaii photo to Mom." The processor of the intelligence server 200 may determine the first rule ID for searching for something in the Internet by using the text corresponding to the first user utterance and sending the found result by using the message app.

The processor of the intelligence server 200 may determine that the first item to which the first tagged utterance text "find something and send something to" based on the first user input and the determined first rule ID is matched is in the first list.

In operation 1301, the processor of the intelligence server 200 may obtain a third tagged utterance text based on a text corresponding to a first user utterance saying that "find a Hawaii photo and send the Hawaii photo to Mom" and a first white list rule ID included in the first item. In some embodiments, the third tagged utterance text may be "search for a photo and send the photo to".

In operation 1302, the processor of the intelligence server 200 may determine whether a second item to which "search for a photo and send the photo to" is matched is in the second list. As assumed in the embodiment, since the second item including a tagged utterance text saying that "search for a photo and send the photo" is in the second list, the processor of the intelligence server 200 may determine whether the second item to which "search for a photo and send the photo to" is matched is in the second list.

In operation 1303, the processor of the intelligence server 200 may provide a second path rule to the user terminal 100.

According to various embodiments, the processor of the intelligence server 200 may generate the second path rule based on the first user utterance input and a second white list rule ID for searching for a photo in a gallery included in the second item, to which a third tagged utterance text is matched, and sending the found result by using a message app and may provide the user terminal 100 with the second path rule. According to certain embodiments, the processor of the intelligence server 200 may provide the user terminal 100 with the second path rule for searching for a Hawaii photo in the gallery and sending the found Hawaii photo to Mom by using the message app.

In another embodiment, the processor of the intelligence server 200 may receive data associated with the first user utterance input saying that "search for and send Hawaii video to Mom." The processor of the intelligence server 200 may determine the first rule ID for searching for something in the Internet by using the text corresponding to the first user utterance and sending the found result by using the message app.

The processor of the intelligence server 200 may determine that the first item to which the first tagged utterance text "find something and send something to" based on the first user input and the determined first rule ID is matched is in the first list.

In operation 1301, the processor of the intelligence server 200 may obtain a third tagged utterance text by using a text corresponding to a first user utterance saying that "find a Hawaii photo and send the Hawaii video to Mom" and a first white list rule ID included in the first item. In some embodiments, the third tagged utterance text may be "search for a video and send the video to".

In operation 1302, the processor of the intelligence server 200 may determine whether a second item to which "search for a video and send the video to" is matched is in the second list. As assumed in the embodiment, since an item including a tagged utterance text saying that "search for a video and send the video" is not in the second list, the processor of the intelligence server 200 may determine that the second item to which "search for a video and send the video to" is matched is not in the second list.

Since the result of operation 1302 indicates that the second item matched to the third tagged utterance text is not in the second list, in operation 1304, the processor of the intelligence server 200 may provide the user terminal 100 with a first path rule.

According to various embodiments, the processor of the intelligence server 200 may provide the user terminal 100 with a first path rule based on a first rule ID and a first user utterance input. According to certain embodiments, the processor of the intelligence server 200 may provide the user terminal 100 with the first path rule for searching for a Hawaii photo in an Internet and sending the found result to Mom by using the message app.

Hereinafter, a method in which an electronic apparatus performs a task depending on a user utterance input will be described with reference to FIGS. 14 and 15.

Figure 14:
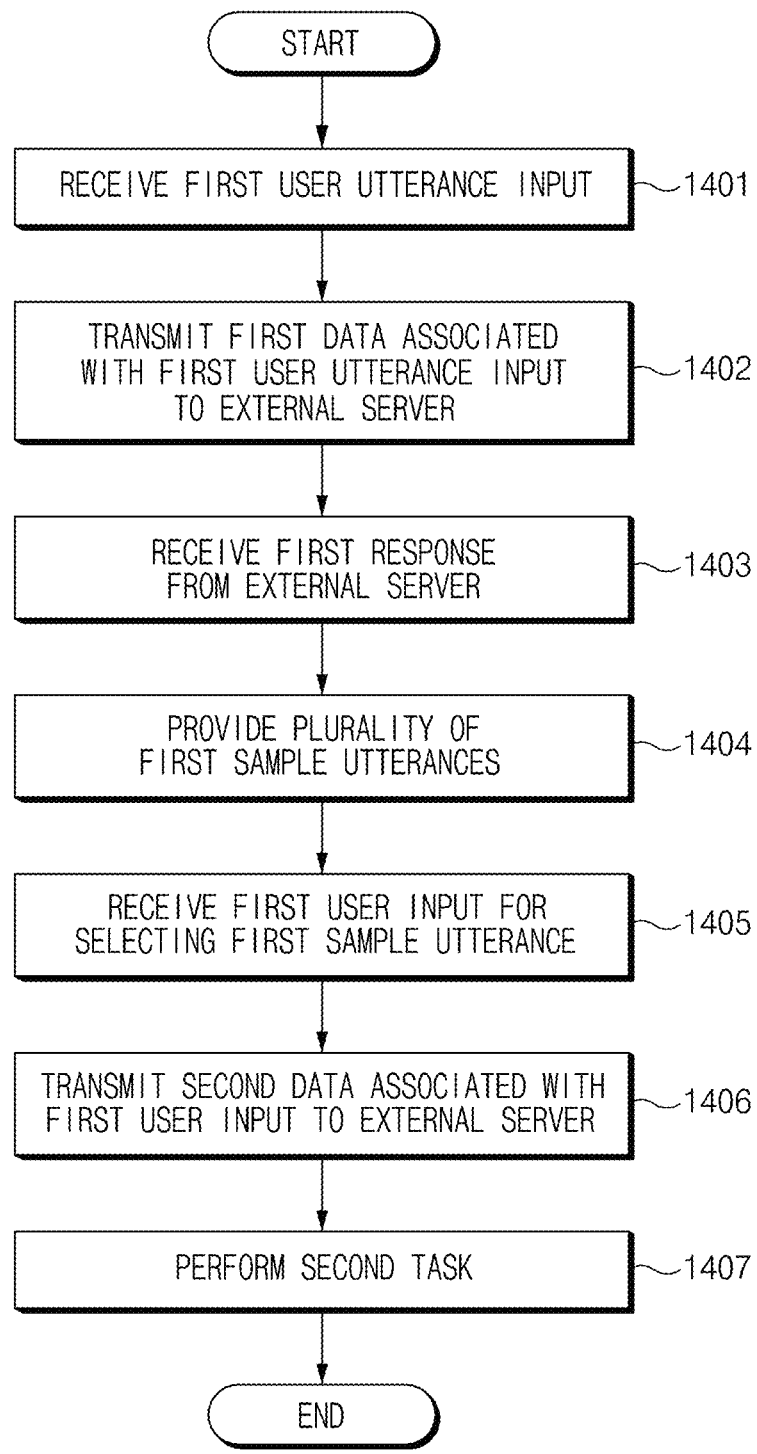
FIG. 14 illustrates operations of a method in which an electronic apparatus performs a task depending on a natural language input according to certain embodiments.

FIG. 14 is a flowchart illustrating a method in which an electronic apparatus performs a task depending on a user utterance input, according to some embodiments.

Hereinafter, it is assumed that the user terminal (or an user terminal 100) of FIG. 2 performs a process of FIG. 14. In addition, as described in FIG. 14, it is understood that the operation described as being executed by the electronic apparatus is controlled by the processor 150 of the user terminal 100. The operation may be implemented with instructions capable of being performed (or executed) by the processor 150 of the user terminal 100. The instructions may be stored in, for example, a computer-readable recording medium or the memory 140 of the user terminal 100 illustrated in FIG. 2.

Referring to FIG. 14, in operation 1401, the processor 150 may receive a first user utterance input through at least one of the touchscreen display 120 or the microphone 111.

According to various embodiments, the first user utterance input may include a first request for performing a first task using an electronic apparatus. For example, the first user utterance input may be "send a Hawaii photo to Mom by a message", and the first user utterance input may include a request for performing a task of searching for a photo captured in Hawaii in a gallery app and sending the found photo to Mom using a message app. According to certain embodiments, the task may mean operations that the user terminal 100 performs.

In operation 1402, the processor 150 may transmit first data associated with the first user utterance input to an external server through a wireless communication circuit. In some embodiments, the first data may include a voice signal corresponding to the first user utterance input and context information indicating the current state of the user terminal 100 at a point in time when the first user utterance input is received. According to various embodiments, the context information may include at least one of information about an app that the user terminal 100 is performing when the first user utterance input is received or state information of the app. In certain embodiments, the state information of the app may include a state ID, specific screen information of the app, specific state information in a specific screen, or the like.

According to some embodiments, the external server may include the intelligence server 200 and the personal information server 300. According to various embodiments, the external server may be the intelligence server 200 including the personal information server 300.

According to certain embodiments, the first data may be transmitted to the intelligence server 200.

In operation 1403, the processor 150 may receive a first response from the external server through the wireless communication circuit.

According to some embodiments, the first response may include information for performing a second task the same as, similar to, or different from the first task.

According to various embodiments, the first response may be generated by performing operation 1211 of the intelligence server 200 described above, and the first response may include a plurality of path rules and a plurality of first sample utterances respectively indicating the path rules for receiving an input that allows the electronic apparatus to select one path rule of the plurality of path rules. According to certain embodiments, the path rules may correspond to information for performing the second task, and the first sample utterance may represent the second task.

In operation 1404, the processor 150 may provide a plurality of first sample utterances included in the first response, through the touchscreen display 120 or the speaker 130.

According to some embodiments, the processor 150 may display a text corresponding to a plurality of first sample utterances that respectively correspond to a plurality of path rules, in the display 120 or may output the text as a voice signal through the speaker 130.

For example, a sample utterance indicating a path rule that searches for Hawaii photos in the gallery and sends the found Hawaii photos to Mom by using a message app may be "send a Hawaii photo to Mom by using a message app."

In operation 1405, according to various embodiments, the processor 150 may receive a first user input for selecting one of a plurality of first sample utterances.

In certain embodiments, the processor 150 may receive the first user input through the microphone 111 or the touchscreen display 120.

In operation 1406, the processor 150 may transmit the second data associated with the first user input to the external server.

According to some embodiments, the second data may correspond to data associated with the selected first sample utterance among the first sample utterances.

According to various embodiments, the second data associated with the first user input may correspond to data associated with the path rule selected in operation 1003 described above.

According to certain embodiments, the second data associated with the first user input may be used such that the external server updates a white list. In some embodiments, the second data associated with the first user input may include at least one of context information (e.g., app information, state information of the app, or the like) at a point in time when the user terminal 100 receives the user utterance input, a rule ID of a path rule corresponding to the selected first sample utterance, a text corresponding to the user utterance, a tagged utterance text, or a domain of the path rule corresponding to the selected first sample utterance.

According to various embodiments, the first data may be transmitted to the personal information server 300.

In operation 1407, the processor 150 may perform the second task. According to certain embodiments, the processor 150 may perform the second task by causing the user terminal 100 to have a sequence of states.

According to some embodiments, the second task may mean operations according to a path rule corresponding to the selected first sample utterance.

According to various embodiments, the processor 150 may receive a second response including information about the sequence of states from the external server through a wireless communication circuit and may perform the second task by using information about the sequence of states included in the second response.

According to certain embodiments, the second response may include a path rule corresponding to the first sample utterance selected in operation 1405.

Figure 15:
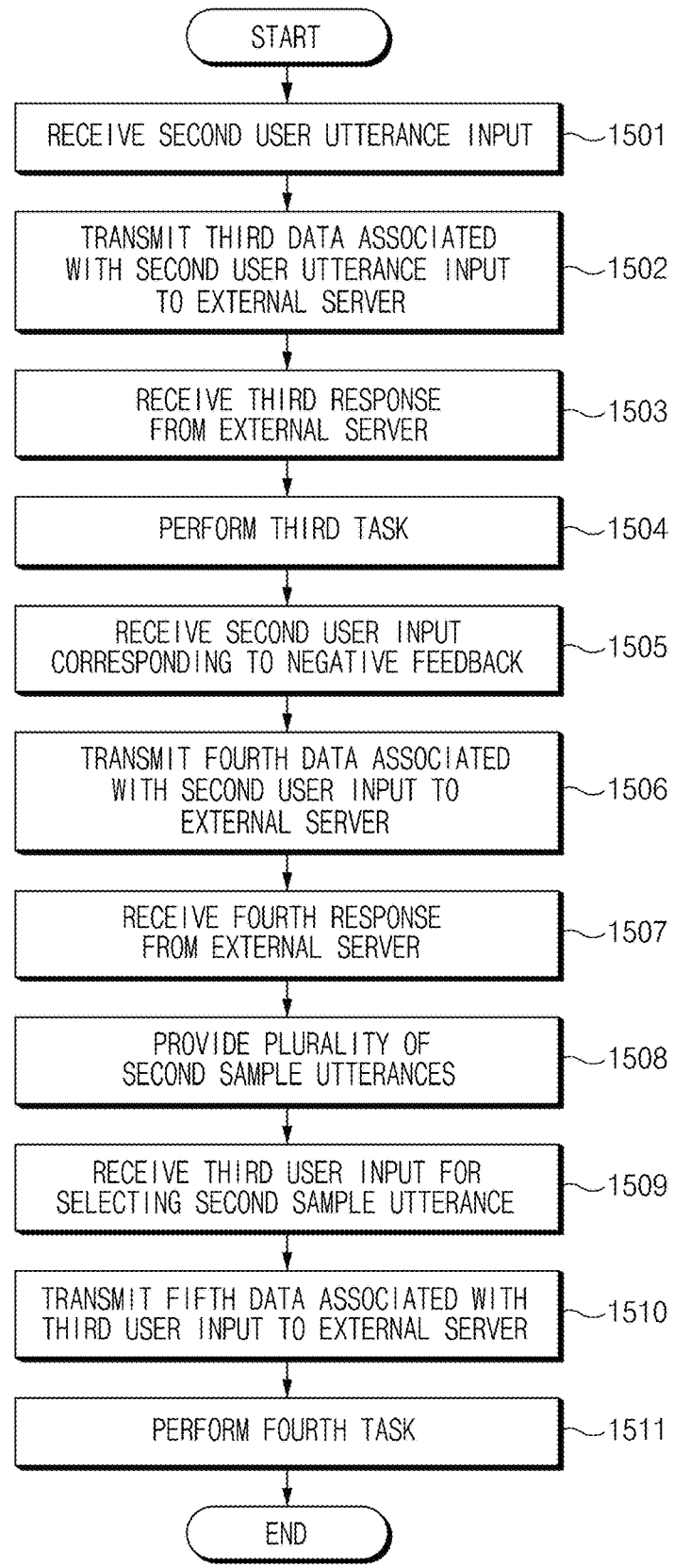
FIG. 15 illustrates operations of a method in which an electronic apparatus performs a task depending on a natural language input according to some embodiments.

FIG. 15 is a flowchart illustrating a method in which the user terminal 100 performs a task depending on a user utterance input, according to some embodiments.

According to various embodiments, operations of FIG. 15 may be performed after operation 1401 to operation 1407 described above are performed.

Referring to FIG. 15, in operation 1501, the processor 150 may receive a second user utterance input through at least one of the touchscreen display 120 or the microphone 111.

According to certain embodiments, the second user utterance input may be the same as a first user utterance input.

According to some embodiments, data associated with the path rule selected by the transmission of the second data associated with the first user input in operation 1406 may be added as a second item to the white list (or second list) described with reference to FIG. 10. According to various embodiments, the added second item may include a tagged utterance text based on the rule ID of the path rule corresponding to the first user utterance and the sample utterance selected in operation 1405.

In operation 1502, the processor 150 may transmit third data associated with the second user utterance input to an external server through a wireless communication circuit. In certain embodiments, the third data may include a voice signal corresponding to the second user utterance input and context information indicating the current state of the user terminal 100 at a point in time when the second user utterance input is received.

In operation 1503, the processor 150 may receive a third response from the external server through the wireless communication circuit. According to some embodiments, the third response may include information about the sequence of states for performing a third task.

In various embodiments, when generating the third response by using the third data, the external server receiving the third data may use the white list.

According to certain embodiments, the white list may include a second item including a tagged utterance text based on the rule ID of the path rule corresponding to the first user utterance input and the sample utterance selected in operation 1405.

According to some embodiments, the tagged utterance text based on the rule ID determined from the second user utterance input and a second user utterance input may be matched to the second item included in the white list. The matched second item may be added in operation 1406.

In various embodiments, an external server may generate a path rule based on the second white list rule ID and the second user utterance input, included in the matched second item, and the generated path rule may be the same as the path rule corresponding to the first sample utterance selected in operation 1405. According to certain embodiments, the third response may include a path rule the same as a path rule included in a second response. In other words, the third task may be the same as the second task.

In operation 1504, the processor 150 may perform the third task by causing the user terminal 100 to have the sequence of states.

According to some embodiments, the third response may include information about the sequence of states the same as the sequence of states for performing the second task, and the processor 150 may perform the third task the same as the second task.

In operation 1505, the processor 150 may receive a second user input corresponding to a negative feedback through at least one of the touchscreen display 120 or the microphone 111.

According to various embodiments, the processor 150 may receive the second user input corresponding to the feedback associated with the third task of operation 1504. In certain embodiments, the second user input may correspond to the negative feedback, and operation 1505 may correspond to operation 1103.

In operation 1506, the processor 150 may transmit fourth data associated with the second user input to the external server.

According to some embodiments, operation 1506 may correspond to a part of operation 1105, and the fourth data associated with the second user input may correspond to data associated with the path rule received in operation 1105 described above.

According to various embodiments, the fourth data associated with the second user input may be used such that the external server updates the black list (or first list). In certain embodiments, the fourth data associated with the second user input may include at least one of context information (e.g., app information, state information of an app, or the like) at a point in time when the user terminal 100 receives a user utterance input, a rule ID of a path rule received in operation 1503, a text corresponding to a second user utterance input, a tagged utterance text, or a domain of a path rule received in operation 1503.

According to some embodiments, operation 1506 may be performed together with operation 1510.

In operation 1507, the processor 150 may receive a fourth response from the external server through the wireless communication circuit. According to various embodiments, the fourth response may include information for performing a fourth task different from the third task.

According to certain embodiments, operation 1507 may correspond to operation 1104. Since the external server has been received a user input corresponding to a negative feedback associated with the third task in operation 1506, the fourth response may include information for performing the fourth task different from the third task.

According to some embodiments, the fourth response may be generated by performing operation 1211 of the intelligence server 200 described above. The fourth response may include a plurality of path rules and a plurality of second sample utterances respectively indicating the path rules for receiving an input that allows the electronic apparatus to select one path rule of the plurality of path rules. According to various embodiments, the path rules may correspond to information for performing the fourth task, and the second sample utterance may represent the fourth task.

In operation 1508, the processor 150 may provide a plurality of second sample utterances included in the fourth response, through the touchscreen display 120 or the speaker 130.

In operation 1509, the processor 150 may receive a third user input for selecting one of the plurality of second sample utterances.

In certain embodiments, the processor 150 may receive the third user input through the microphone 111 or the touchscreen display 120.

In operation 1510, the processor 150 may transmit fifth data associated with the third user input to the external server.

According to some embodiments, the fourth data corresponding to the negative feedback associated with the third task may be transmitted to the external server in operation 1506, and the external server may delete data associated with the first user utterance input, which is added to the white list in operation 1406, from the white list and may add the data associated with the first user utterance input to the black list.

According to various embodiments, in operation 1510, the fifth data may be transmitted to the external server, and the external server may add data associated with the third user utterance input to the white list by using the fifth data.

For example, in the case where user utterance input 'A' corresponding to the first user utterance input and rule ID 'A' corresponding to the first user input are added to the white list in operation 1406, in operation 1506, user utterance input 'A' and rule ID 'A' may be deleted from the white list and may be added to the black list. In operation 1510, user utterance input 'A' corresponding to the second user utterance and rule ID 'B' corresponding to the third user input may be added to the white list.

In operation 1511, the processor 150 may perform a fourth task. According to certain embodiments, the fourth task may mean operations according to a path rule corresponding to the second sample utterance selected by a third user input.

Figure 16:
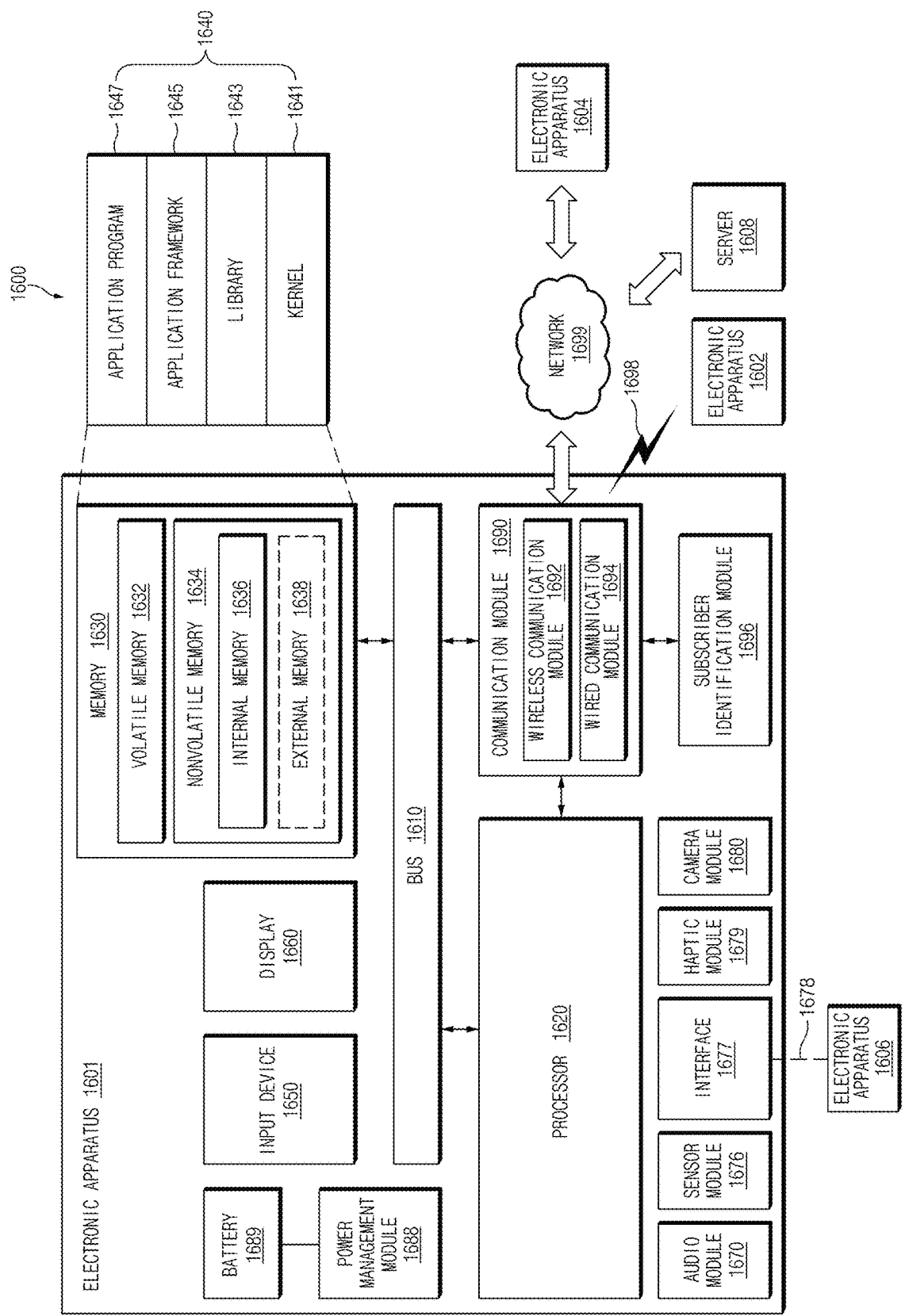
FIG. 16 illustrates, in block diagram format, an electronic apparatus in a network environment, according to various embodiments.

FIG. 16 illustrates an electronic apparatus 1601 in a network environment 1600, according to various embodiments. According to various embodiments disclosed in the present disclosure, the electronic apparatus 1601 may include various types of devices. For example, the electronic apparatus 1601 may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic apparatus may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic apparatus may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to some embodiments of the disclosure, the electronic apparatus is not limited to the above-described devices. For example, similarly to a smartphone having function of measuring personal bio-information (e.g., a heart rate or blood glucose), the electronic apparatus may provide functions of multiple devices in the complex manner. In the present disclosure, the term "user" used herein may refer to a person who uses the electronic apparatus or may refer to a device (e.g., an artificial intelligence electronic apparatus) that uses the electronic apparatus.

Referring to FIG. 16, under the network environment 1600, the electronic apparatus 1601 (e.g., an electronic apparatus) may communicate with an electronic apparatus 1602 through local wireless communication 1698 or may communication with an electronic apparatus 1604 or a server 1608 through a network 1699. According to various embodiments, the electronic apparatus 1601 may communicate with the electronic apparatus 1604 through the server 1608.

According to certain embodiments, the electronic apparatus 1601 may include a bus 1610, a processor 1620 (e.g., the processor 150) a memory 1630, an input device 1650 (e.g., a micro-phone or a mouse), a display 1660, an audio module 1670, a sensor module 1676, an interface 1677, a haptic module 1679, a camera module 1680, a power management module 1688, a battery 1689, a communication module 1690, and a subscriber identification module 1696. According to some embodiments, the electronic apparatus 1601 may not include at least one (e.g., the display 1660 or the camera module 1680) of the above-described elements or may further include other element(s).

For example, the bus 1610 may interconnect the above-described elements 1620 to 1690 and may include a circuit for conveying signals (e.g., a control message or data) between the above-described elements.

The processor 1620 may include one or more of a central processing unit (CPU), an application processor (AP), an graphic processing unit (GPU), an image signal processor (ISP) of a camera or a communication processor (CP). According to various embodiments, the processor 1620 may be implemented with a system on chip (SoC) or a system in package (SiP). For example, the processor 1620 may drive an operating system (OS) or an application to control at least one of another element (e.g., hardware or software element) connected to the processor 1620 and may process and compute various data. The processor 1620 may load a command or data, which is received from at least one of other elements (e.g., the communication module 1690), into a volatile memory 1632 to process the command or data and may store the process result data into a nonvolatile memory 1634.

The memory 1630 may include, for example, the volatile memory 1632 or the nonvolatile memory 1634. The volatile memory 1632 may include, for example, a random access memory (RAM) (e.g., a dynamic RAM (DRAM), a static RAM (SRAM), or a synchronous dynamic RAM (SDRAM)). The nonvolatile memory 1634 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 1634 may be configured in the form of an internal memory 1636 or the form of an external memory 1638 which is available through connection only if necessary, according to the connection with the electronic apparatus 1601. The external memory 1638 may further include a flash drive such as compact flash (CF), secure digital (SD), micro secure digital (Micro-SD), mini secure digital (Mini-SD), extreme digital (xD), a multimedia card (MMC), or a memory stick. The external memory 1638 may be operatively or physically connected with the electronic apparatus 1601 in a wired manner (e.g., a cable or a universal serial bus (USB)) or a wireless (e.g., Bluetooth) manner.

For example, the memory 1630 may store, for example, at least one different software element, such as an instruction or data associated with the program 1640, of the electronic apparatus 1601. The program 1640 may include, for example, a kernel 1641, a library 1643, an application framework 1645 or an application program (interchangeably, "application") 1647.

The input device 1650 may include a microphone, a mouse, or a keyboard. According to certain embodiments, the keyboard may include a keyboard physically connected or a keyboard virtually displayed through the display 1660.

The display 1660 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to some embodiments, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic apparatus 1601.

The audio module 1670 may convert, for example, from a sound into an electrical signal or from an electrical signal into the sound. According to various embodiments, the audio module 1670 may obtain sound through the input device 1650 (e.g., a microphone) or may output sound through an output device (not illustrated) (e.g., a speaker or a receiver) included in the electronic apparatus 1601, an external electronic apparatus (e.g., the electronic apparatus 1602 (e.g., a wireless speaker or a wireless headphone)) or an electronic apparatus 1606 (e.g., a wired speaker or a wired headphone) connected with the electronic apparatus 1601

The sensor module 1676 may measure or detect, for example, an internal operating state (e.g., power or temperature) or an external environment state (e.g., an altitude, a humidity, or brightness) of the electronic apparatus 1601 to generate an electrical signal or a data value corresponding to the information of the measured state or the detected state. The sensor module 1676 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (FIRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1676 may further include a control circuit for controlling at least one or more sensors included therein. According to certain embodiments, the electronic apparatus 1601 may control the sensor module 1676 by using the processor 1620 or a processor (e.g., a sensor hub) separate from the processor 1620. In the case that the separate processor (e.g., a sensor hub) is used, while the processor 1620 is in a sleep state, the electronic apparatus 1601 may control at least part of the operation or the state of the sensor module 1676 by the operation of the separate processor without awakening the processor 1620.

According to some embodiments, the interface 1677 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 1678 may physically connect the electronic apparatus 1601 and the electronic apparatus 1606. According to various embodiments, the connector 1678 may include, for example, an USB connector, an SD card/MMC connector, or an audio connector (e.g., a headphone connector).

The haptic module 1679 may convert an electrical signal into mechanical stimulation (e.g., vibration or motion) or into electrical stimulation. For example, the haptic module 1679 may apply tactile or kinesthetic stimulation to a user. The haptic module 1679 may include, for example, a motor, a piezoelectric element, or an electric stimulator.

The camera module 1680 may capture, for example, a still image and a moving picture. According to certain embodiments, the camera module 1680 may include at least one lens (e.g., a wide-angle lens and a telephoto lens, or a front lens and a rear lens), an image sensor, an image signal processor, or a flash (e.g., a light emitting diode or a xenon lamp).

The power management module 1688, which is to manage the power of the electronic apparatus 1601, may constitute at least a portion of a power management integrated circuit (PMIC).

The battery 1689 may include a primary cell, a secondary cell, or a fuel cell and may be recharged by an external power source to supply power at least one element of the electronic apparatus 1601.

The communication module 1690 may establish a communication channel between the electronic apparatus 1601 and an external device (e.g., the first external electronic apparatus 1602, the second external electronic apparatus 1604, or the server 1608). The communication module 1690 may support wired communication or wireless communication through the established communication channel. According to some embodiments, the communication module 1690 may include a wireless communication module 1692 or a wired communication module 1694. The communication module 1690 may communicate with the external device through a first network 1698 (e.g. a wireless local area network such as Bluetooth or infrared data association (IrDA)) or a second network 1699 (e.g., a wireless wide area network such as a cellular network) through a relevant module among the wireless communication module 1692 or the wired communication module 1694.

The wireless communication module 1692 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to various embodiments, when the wireless communication module 1692 supports cellar communication, the wireless communication module 1692 may, for example, identify or authenticate the electronic apparatus 1601 within a communication network using the subscriber identification module (e.g., a SIM card) 1696. According to certain embodiments, the wireless communication module 1692 may include a communication processor (CP) separate from the processor 2820 (e.g., an application processor (AP). In this case, the communication processor may perform at least a portion of functions associated with at least one of elements 1610 to 1696 of the electronic apparatus 1601 in substitute for the processor 1620 when the processor 1620 is in an inactive (sleep) state, and together with the processor 1620 when the processor 1620 is in an active state. According to some embodiments, the wireless communication module 1692 may include a plurality of communication modules, each supporting only a relevant communication scheme among cellular communication, short-range wireless communication, or a GNSS communication scheme.

The wired communication module 1694 may include, for example, include a local area network (LAN) service, a power line communication, or a plain old telephone service (POTS).

For example, the first network 1698 may employ, for example, Wi-Fi direct or Bluetooth for transmitting or receiving instructions or data through wireless direct connection between the electronic apparatus 1601 and the first external electronic apparatus 1602. The second network 1699 may include a telecommunication network (e.g., a computer network such as a LAN or a WAN, the Internet or a telephone network) for transmitting or receiving instructions or data between the electronic apparatus 1601 and the second electronic apparatus 1604.

According to embodiments, the instructions or the data may be transmitted or received between the electronic apparatus 1601 and the second external electronic apparatus 1604 through the server 1608 connected with the second network. Each of the external first and second external electronic apparatuses 1602 and 1604 may be a device of which the type is different from or the same as that of the electronic apparatus 1601. According to various embodiments, all or a part of operations that the electronic apparatus 1601 will perform may be executed by another or a plurality of electronic apparatuses (e.g., the electronic apparatuses 1602 and 1604 or the server 1608). According to various embodiments, in the case that the electronic apparatus 1601 executes any function or service automatically or in response to a request, the electronic apparatus 1601 may not perform the function or the service internally, but may alternatively or additionally transmit requests for at least a part of a function associated with the electronic apparatus 1601 to any other device (e.g., the electronic apparatus 1602 or 1604 or the server 1608). The other electronic apparatus (e.g., the electronic apparatus 1602 or 1604 or the server 1608) may execute the requested function or additional function and may transmit the execution result to the electronic apparatus 1601. The electronic apparatus 1601 may provide the requested function or service using the received result or may additionally process the received result to provide the requested function or service. To this end, for example, cloud computing, distributed computing, or client-server computing may be used.

According to certain embodiments of the present disclosure, an electronic apparatus may include a housing, a touch screen display disposed inside the housing and exposed through a first portion of the housing, a microphone disposed inside the housing and exposed through a second portion of the housing, at least one speaker disposed inside the housing and exposed through a third portion of the housing, a wireless communication circuit disposed inside the housing, a processor disposed inside the housing and electrically connected to the touch screen display, the microphone, the at least one speaker, and the wireless communication circuit, and a memory disposed inside the housing, and electrically connected to the processor. The memory stores instructions that, when executed, cause the processor to receive a first user utterance input through at least one of the touch screen display or the microphone, to transmit first data associated with the first user utterance input to an external server through the wireless communication circuit, to receive a first response from the external server through the wireless communication circuit, to provide the plurality of first sample utterances through the touch screen display or the speaker, to receive a first user input for selecting one of the plurality of first sample utterances, to transmit second data associated with the first user input to the external server, and after transmitting the second data, to perform the second task by causing the electronic apparatus to have a sequence of states. The first user utterance input may include a request for performing a first task using the electronic apparatus. The first response may include a plurality of first sample utterances indicating a second task the same as, similar to, or different from the first task.

In some embodiments, the instructions may cause the processor, after transmitting the second data, to receive a second response from the external server through the wireless communication circuit, and the second response may include information about the sequence of the states.

In various embodiments, the instructions may cause the processor, after transmitting the second data, to receive a second user utterance input through at least one of the touch screen display or the microphone, to transmit third data associated with the second user utterance input to the external server through the wireless communication circuit, to receive a third response from the external server through the wireless communication circuit, and, after receiving the third response, to perform the third task by causing the electronic apparatus to have the sequence of the states that the third response includes. The second user utterance input may be the same as the first user utterance input. The third response may include the information about the sequence of the states for performing a third task, and the information about the sequence of the states, which the third response includes, may be the same as the information about the sequence of the states, which the second response includes.

In certain embodiments, the instructions may cause the processor, after performing the third task, to receive a second user input corresponding to a negative feedback through at least one of the touch screen display or the microphone and to transmit fourth data associated with the second user input to the external server.

In some embodiments, the instructions may cause the processor, after receiving the second user input, to receive a fourth response from the external server through the wireless communication circuit, to provide the plurality of second sample utterances through the touch screen display or the speaker, to receive a third user input for selecting one of the plurality of second sample utterances, to transmit fifth data associated with the third user input to the external server, and after transmitting the fifth data, to perform the fourth task. The fourth response may include a plurality of second sample utterances indicating a fourth task different from the third task.

In various embodiments, the external server may include a first external server and a second external server, and the instructions may cause the processor to transmit the first data to the first external server and to transmit the second data to the second external server.

In addition, according to certain embodiments of the present disclosure, a system device may include a communication interface connected to a network, a processor electrically connected to the communication interface, and a memory electrically connected to the processor. The memory may store instructions that, when executed, cause the processor to receive first data associated with a first user utterance input from an electronic apparatus through the communication interface, wherein the first data associated with the first user utterance input includes at least one of the first user utterance input or context information of the electronic apparatus, to perform a natural language understanding process for a first request, to determine a plurality of rule IDs and a confidence level corresponding to each of the plurality of rule IDs from the natural language understanding process, when the confidence level exceeds a critical value, to determine whether a first item, to which a first tagged utterance text being a text corresponding to a first rule ID is matched, in a text corresponding to the first user utterance input is in a first list of pre-stored first items, wherein the first rule ID is a rule ID, which has the highest confidence level, from among the determined plurality of rule IDs, when the first item, to which the first tagged utterance text is matched, is not in the first list, provide the electronic apparatus with the first rule ID and a first path rule based on the first data, and when the first item to which the first tagged utterance text is matched is in the first list, to provide the electronic apparatus with a first white list rule ID that the matched first item includes and a second path rule based on the first data, and when the confidence level does not exceed the critical value, to select a plurality of third rule IDs being at least part of a rule ID among the plurality of rule IDs, to determine whether a second item, to which at least one of a plurality of second tagged utterance texts being a text, which corresponds to each of the plurality of third rule IDs, in the text corresponding to the first user utterance input is matched is in a second list of pre-stored second items, when the second item to which at least one of the second tagged utterance texts is matched is not in the second list, to provide the electronic apparatus with the first data and a plurality of sample utterances respectively corresponding to the plurality of third rule IDs, and when the second item to which at least one of the second tagged utterance texts is matched is in the second list, to provide the electronic apparatus with a fourth path rule based on the first data and a second white list rule ID included in the second item to which the at least one of the second tagged utterance texts is matched.

In some embodiments, each of the first items of the first list may include at least one of an identifier of the first item, a text corresponding to a user utterance input corresponding to the first item, the context information of the electronic apparatus at a point in time when the first item is generated, a rule ID of the first item, a tagged utterance text being a text corresponding to the rule ID of the first item in the text corresponding to the user utterance input, a domain of the user utterance input corresponding to the first item, or the first white list rule ID being a rule ID of a path rule selected by the electronic apparatus when the first item is generated.

In various embodiments, each of the second items of the second list may include at least one of an identifier of the second item, a text corresponding to a user utterance input corresponding to the second item, the context information of the electronic apparatus at a point in time when the second item is generated, a second white list rule ID of the second item, a tagged utterance text being a text corresponding to the second white list rule ID in the text corresponding to the user utterance input, or a domain of the user utterance input corresponding to the second item.

In certain embodiments, the first item may include the context information of the electronic apparatus at a point in time when the first item is generated, and the fact that the first item to which the first tagged utterance text is matched is in the first list may include that context information of the electronic apparatus included in the first data is matched to the context information of the electronic apparatus at a point in time when the first item is generated.

In some embodiments, the first item may include the first white list rule ID being a rule ID of a path rule selected by the electronic apparatus when the first item is generated, and the instructions may cause the processor, when the first item to which the first tagged utterance text is matched is in the first list, to determine whether the second item to which a third tagged utterance text being a text corresponding to the first white list rule ID in the text corresponding to the first user utterance input is matched is in the second list, when the second item to which the third tagged utterance text is matched is in the second list, to provide the electronic apparatus with the second path rule, and when the second item to which the third tagged utterance text is matched is not in the second list, to provide the electronic apparatus with the first path rule.

In various embodiments, the second item may include the context information of the electronic apparatus at a point in time when the second item is generated, and the fact that the second item to which the third tagged utterance text is matched is in the second list may include that context information of the electronic apparatus included in the first data is matched to the context information of the electronic apparatus at a point in time when the second item is generated.

In certain embodiments, a confidence level of each of the selected plurality of third rule IDs among the at least one rule IDs may be higher than a confidence level of each of unselected rule IDs among the plurality of requests.

Furthermore, according to some embodiments of the present disclosure, a computer-readable storage medium may store instructions, when executed by a processor of a system device, cause the system device to receive first data associated with a first user utterance input from an electronic device through the communication interface, to perform a natural language understanding process for a first request, to determine a plurality of rule IDs and a confidence level corresponding to each of the plurality of rule IDs from the natural language understanding process, when the confidence level exceeds a critical value, to determine whether a first item, to which a first tagged utterance text being a text corresponding to a first rule ID is matched, in a text corresponding to the first user utterance input is in a first list of pre-stored first items, and when the first item, to which the first tagged utterance text is matched, is not in the first list, to provide the electronic device with the first rule ID and a first path rule based on the first data, and when the first item to which the first tagged utterance text is matched is in the first list, to provide the electronic device with a first white list rule ID that the matched first item includes and a second path rule based on the first data, and when the confidence level does not exceed the critical value, select a plurality of third rule IDs being at least part of a rule ID among the plurality of rule IDs, to determine whether a second item, to which at least one of a plurality of second tagged utterance texts being a text, which corresponds to each of the plurality of third rule IDs, in the text corresponding to the first user utterance input is matched is in a second list of pre-stored second items, when the second item to which at least one of the second tagged utterance texts is matched is not in the second list, to provide the electronic device with the first data and a plurality of sample utterances respectively corresponding to the plurality of third rule IDs, and when the second item to which at least one of the second tagged utterance texts is matched is in the second list, to provide the electronic device with a fourth path rule based on the first data and a second white list rule ID included in the second item to which at least one of the second tagged utterance texts is matched. The first data associated with the first user utterance input may include at least one of the first user utterance input or context information of the electronic device, the first rule ID is a rule ID, which has the highest confidence level, from among the determined plurality of rule IDs.

In various embodiments, each of the first items of the first list may include at least one of an identifier of the first item, a text corresponding to a user utterance input corresponding to the first item, the context information of the electronic apparatus at a point in time when the first item is generated, a rule ID of the first item, a tagged utterance text being a text corresponding to the rule ID of the first item in the text corresponding to the user utterance input, a domain of the user utterance input corresponding to the first item, or the first white list rule ID being a rule ID of a path rule selected by the electronic apparatus when the first item is generated.

In certain embodiments, each of the second items of the second list may include at least one of an identifier of the second item, a text corresponding to a user utterance input corresponding to the second item, the context information of the electronic apparatus at a point in time when the second item is generated, a second white list rule ID of the second item, a tagged utterance text being a text corresponding to the second white list rule ID in the text corresponding to the user utterance input, or a domain of the user utterance input corresponding to the second item.

In some embodiments, the first item may include the context information of the electronic apparatus at a point in time when the first item is generated, and the fact that the first item to which the first tagged utterance text is matched is in the first list may include that context information of the electronic apparatus included in the first data is matched to the context information of the electronic apparatus at a point in time when the first item is generated.

In various embodiments, the first item may include the first white list rule ID being a rule ID of a path rule selected by the electronic apparatus when the first item is generated, and when executed by the processor of the system device, the instructions may further cause the processor, when the first item to which the first tagged utterance text is matched is in the first list, to determine whether the second item to which a third tagged utterance text being a text corresponding to the first white list rule ID in the text corresponding to the first user utterance input is matched is in the second list, when the second item to which the third tagged utterance text is matched is in the second list, to provide the electronic apparatus with the second path rule, and when the second item to which the third tagged utterance text is matched is not in the second list, to provide the electronic apparatus with the first path rule.

In certain embodiments, the second item may include the context information of the electronic apparatus at a point in time when the second item is generated, and the fact that the second item to which the third tagged utterance text is matched is in the second list may include that context information of the electronic apparatus included in the first data is matched to the context information of the electronic apparatus at a point in time when the second item is generated.

In some embodiments, a confidence level of each of the selected plurality of third rule IDs among the at least one rule IDs may be higher than a confidence level of each of unselected rule IDs among the plurality of requests.

Moreover, according to various embodiments of the present disclosure, a system device may include a communication interface connected to a network, a processor electrically connected to the communication interface, and a memory electrically connected to the processor. The memory may store instructions that, when executed, cause the processor to receive first data associated with a first natural language input from an electronic apparatus through the communication interface, to perform a natural language understanding process for the first request, to determine a confidence level from the natural language understanding process, when the confidence level exceeds a critical value, to determine whether the first request is in a first list of pre-stored requests, when the first request is in the first list, to provide the electronic apparatus with a response for a second request different from the first request, and when the first request is not in the first list, to provide the electronic apparatus with a response for the first request; and when the confidence level does not exceed the critical value, to select a plurality of third requests, meaning each of which is the same as, similar to, or different from meaning of the first request, to determine whether at least one of the selected third requests is in a second list of the pre-stored requests, when the at least one of the selected third requests is in the second list of the pre-stored requests, to provide the electronic apparatus with a response for the at least one third request, and when the selected third requests are not in the second list of the pre-stored requests, to provide the electronic apparatus with information about the selected third requests. The first natural language input may include a first request for performing a first task using the electronic apparatus.

According to certain embodiments, a natural language input may correspond to a user utterance input.

According to some embodiments, the request may indicate context at a point in time when a natural language input is received in an electronic device by a user, and the request may include a tagged utterance text corresponding to the determined intent (or rule ID) among the natural language input, context information of the electronic device, or a text corresponding to the natural language input.

In various embodiments, each of the pre-stored requests of the first list may include at least one of an identifier of a request, a text corresponding to a natural language input corresponding to the request, context information of the electronic apparatus at a point in time when the request is generated, intent of the request, a tagged utterance text being a text, which corresponds to the intent of the request, in a text corresponding to a natural language input, a domain of the natural language input corresponding to the request, or intent of the third request selected by the electronic apparatus when the request is generated.

In certain embodiments, each of the pre-stored requests of the second list may include at least one of an identifier of a request, a text corresponding to a natural language input corresponding to the request, context information of the electronic apparatus at a point in time when the request is generated, intent of the request, a tagged utterance text being a text, which corresponds to the intent of the request, in the text corresponding to the natural language input, or a domain of the natural language input corresponding to the request.

In some embodiments, each of the pre-stored requests of the first list may include context information of the electronic apparatus at a point in time when each of the requests is generated, and determining whether the first request is in the first list of the pre-stored requests may include determining whether context information of the electronic apparatus included in the first request is matched to context information of each of requests of the first list.

In various embodiments, each of the pre-stored requests of the first list may include a third request selected by the electronic apparatus when each of the requests is generated, and the instructions may cause the processor, when the first request is in the first list, to determine whether a request to which a tagged utterance text being a text, which corresponds to intent of a pre-stored request of the first list corresponding to the first request, in a text corresponding to the first natural language input is matched is in the second list, when the request to which the tagged utterance text is matched is in the second list, to provide the electronic apparatus with the response for the second request, and when the request to which the tagged utterance text is matched is not in the second list, to provide the electronic apparatus with the response for the first request.

In certain embodiments, each of the pre-stored requests of the first list may include a third request selected by the electronic apparatus when each of the requests is generated, and the instructions may cause the processor, when the first request is in the first list, to determine whether a request to which a tagged utterance text being a text, which corresponds to intent of a pre-stored request of the first list corresponding to the first request, in a text corresponding to the first natural language input is matched is in the second list, when the request to which the tagged utterance text is matched is in the second list, to provide the electronic apparatus with the response for the second request, and when the request to which the tagged utterance text is matched is not in the second list, to provide the electronic apparatus with the response for the first request.

In some embodiments, each of the pre-stored requests of the second list may include context information of the electronic apparatus at a point in time when each of the requests is generated, and determining whether the third request is in the second list of the pre-stored requests may include determining whether context information of the electronic apparatus included in the third request is matched to context information of each of requests of the first list.

In various embodiments, the instructions may cause the processor to select the plurality of third requests from among a plurality of requests which are determined from the natural language understanding process.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 430).

The term "module" used in this specification may include a unit implemented with hardware, software, or firmware. For example, the term "module" may be interchangeably used with the term "logic", "logic block", "component", "circuit", and the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 430) in the form of a program module. The instruction, when executed by a processor (e.g., a processor 420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic apparatus comprising:
a housing;
a touch screen display disposed inside the housing and exposed through a first portion of the housing;
a microphone disposed inside the housing and exposed through a second portion of the housing;
at least one speaker disposed inside the housing and exposed through a third portion of the housing;
a wireless communication circuit disposed inside the housing;
a processor disposed inside the housing and electrically connected to the touch screen display, the microphone, the at least one speaker, and the wireless communication circuit; and
a memory disposed inside the housing, and electrically connected to the processor,
wherein the memory stores instructions that, when executed, cause the processor to:
receive a first user utterance input through at least one of the touch screen display or the microphone, wherein the first user utterance input includes a request for performing a first task using the electronic apparatus,
transmit first data associated with the first user utterance input to an external server through the wireless communication circuit,
receive a first response from the external server through the wireless communication circuit, wherein the first response includes a plurality of first sample utterances,
provide the plurality of first sample utterances through the touch screen display or the at least one speaker,
receive a first user input for selecting one of the plurality of first sample utterances,
transmit second data associated with the first user input to the external server,
receive a second response from the external server through the wireless communication circuit, wherein the second response includes information about a sequence of states for performing a second task,
perform the second task, according to the information about the sequence of the states included in the second response,
after transmitting the second data, receive a second user utterance input through at least one of the touch screen display or the microphone, wherein the second user utterance input matches the first user utterance input,
transmit third data associated with the second user utterance input to the external server through the wireless communication circuit,
receive a third response from the external server through the wireless communication circuit, wherein the third response includes information about the sequence of the states for performing a third task, wherein the information of the third response matches the information of the second response; and
after receiving the third response, perform the third task according to the information about the sequence of the states included in the third response.

2. The electronic apparatus of claim 1, wherein the processor is further configured to:
after performing the third task, receive a second user input corresponding to a negative feedback through at least one of the touch screen display or the microphone; and
transmit fourth data associated with the second user input to the external server.

3. The electronic apparatus of claim 2, wherein the processor is further configured to:
after receiving the second user input, receive a fourth response from the external server through the wireless communication circuit, wherein the fourth response includes a plurality of second sample utterances indicating a fourth task different from the third task;
provide the plurality of second sample utterances through the touch screen display or the at least one speaker;

receive a third user input for selecting one of the plurality of second sample utterances;
transmit fifth data associated with the third user input to the external server; and
after transmitting the fifth data, perform the fourth task.

4. The electronic apparatus of claim 1, wherein:
the external server includes a first external server and a second external server, and
the processor is further configured to:
transmit the first data to the first external server; and
transmit the second data to the second external server.

5. The electronic apparatus of claim 1, wherein:
the first response includes a first rule ID and a first path rule based on the first data associated with the first user utterance input, if a confidence level corresponding to each of a plurality of rule IDs from a natural language understanding process for a first request exceeds a critical value, and if a first item, to which a first tagged utterance text comprising a text corresponding to the first rule ID is matched, in a text corresponding to the first user utterance input is not in a first list of pre-stored first items, wherein the first rule ID includes a highest confidence level, from among the plurality of rule IDs, wherein the first data associated with the first user utterance input includes at least one of the first user utterance input or context information of the electronic apparatus,
the first response includes a first white list rule ID that the first item that is matched include s and a second path rule based on the first data, if the confidence level exceeds the critical value, and if the first item is in the first list,
the first response includes the first data and a plurality of sample utterances corresponding to a plurality of third rule IDs, respectively, wherein the plurality of third rule IDs are selected from the plurality of rule IDs, if the confidence level does not exceed the critical value, and if a second item, to which at least one of a plurality of second tagged utterance texts that corresponds to the first user utterance input is matched is not in a second list of pre-stored second items,
the first response includes a fourth path rule based on the first data and a second white list rule ID included in the second item to which the at least one of the second tagged utterance texts is matched, if the confidence level does not exceed the critical value, and if the second item is in the second list.

6. The electronic apparatus of claim 5, wherein each of the pre-stored first items of the first list includes at least one of:
an identifier of the first item,
a text corresponding to a user utterance input corresponding to the first item,
context information based on a time when the first item is generated,
a rule ID of the first item,
a tagged utterance text comprising a text corresponding to the rule ID of the first item in the text corresponding to the user utterance input,
a domain of the user utterance input corresponding to the first item, or
a first white list rule ID which is a rule ID of a path rule selected by the electronic apparatus when the first item is generated.

7. The electronic apparatus of claim 5, wherein each the pre-stored second items of the second list includes at least one of:
an identifier of the second item,
a text corresponding to a user utterance input corresponding to the second item,
context information based on a time when the second item is generated,
a second white list rule ID of the second item,
a tagged utterance text comprising a text corresponding to the second white list rule ID in the text corresponding to the user utterance input, or
a domain of the user utterance input corresponding to the second item.

8. The electronic apparatus of claim 5, wherein:
the first item includes context information of the electronic apparatus at a point in time when the first item is generated, and
to determine that the first item to which the first tagged utterance text is matched is in the first list of pre-stored first items, context information included in the first data is matched to the context information included in the first item.

9. The electronic apparatus of claim 5, wherein:
the first item includes the first white list rule ID, wherein the first white list rule ID is a rule ID of a path rule selected by the electronic apparatus when the first item is generated,
the first response includes the second path rule, if the first item is in the first list, and if the second item is in the second list, and
the first response includes the first path rule, if the first item is in the first list, and if the second item is not in the second list.

10. The electronic apparatus of claim 9, wherein:
the second item includes context information of the electronic apparatus at a point in time when the second item is generated, and
to determine that the second item in the second list of pre-stored second items, context information included in the first data is matched to the context information included in the second item.

11. The electronic apparatus of claim 5, wherein a confidence level of each of the plurality of third rule IDs that are selected from the plurality of rule IDs is higher than a confidence level of each of unselected rule IDs among the plurality of rule IDs.

12. The electronic apparatus of claim 1, wherein:
the first response includes a response for a second request different from a first request for performing the first task, if a confidence level determined from a natural language understanding process for the first request exceeds a critical value, and if the first request is in a first list of pre-stored requests, wherein the first request is included in a first natural language input and is associated with the first data,
the first response includes a response for the first request, if the confidence level exceeds the critical value, and if the first request is not in the first list,
the first response includes a response for at least one third request, if the confidence level does not exceed the critical value, and if at least one of a plurality of third requests selected to match or differ from a meaning of the first request is in a second list of pre-stored requests, and
the first response includes information about the plurality of third requests, if the confidence level does not exceed the critical value, and if the plurality of third requests are not in the second list.

13. The electronic apparatus of claim 12, wherein each of the pre-stored requests of the first list includes at least one of:
- an identifier of a request,
- a text corresponding to a natural language input corresponding to the request,
- context information based on a time when the request is generated,
- intent of the request,
- a tagged utterance text comprising a text, which corresponds to the intent of the request, in a text corresponding to a user utterance input,
- a domain of the natural language input corresponding to the request, or
- intent of a third request selected by the electronic apparatus when the request is generated.

14. The electronic apparatus of claim 12, wherein each of the pre-stored requests of the second list includes at least one of:
- an identifier of a request,
- a text corresponding to a natural language input corresponding to the request,
- context information based on a time when the request is generated,
- intent of the request,
- a tagged utterance text being a text that corresponds to the intent of the request,
- in the text corresponding to the natural language input, or
- a domain of the natural language input corresponding to the request.

15. The electronic apparatus of claim 12, wherein:
- each of the pre-stored requests of the first list includes context information that is based on a time when the request is generated, and
- the first request is determined as being in the first list, as context information of the electronic apparatus included in the first request is determined to be matched to context information of each of requests of the first list.

16. The electronic apparatus of claim 12, wherein:
- each of the pre-stored requests of the first list includes a third request, and
- the first response includes the response for the second request, if the first request is in the first list, and if a request to which a tagged utterance text that corresponds to the first natural language input is matched is in the second list,
- the first response includes the response for the first request, if the first request is in the first list, and if the request to which the tagged utterance text is matched is not in the second list.

17. The electronic apparatus of claim 12, wherein:
- each of the pre-stored requests of the second list includes context information that is based on a time when the request is generated, and
- the at least one third request is determined as being in the second list based on matching context information.

18. The electronic apparatus of claim 12, wherein the plurality of third requests are selected from among a plurality of requests which are determined from the natural language understanding process.

* * * * *